(12) United States Patent
Bijamov et al.

(10) Patent No.: US 10,545,604 B2
(45) Date of Patent: Jan. 28, 2020

(54) APPORTIONMENT OF FORCES FOR MULTI-TOUCH INPUT DEVICES OF ELECTRONIC DEVICES

(71) Applicant: Apple Inc., Cupertino, CA (US)

(72) Inventors: Alex Bijamov, Cupertino, CA (US); Wayne C. Westerman, Cupertino, CA (US); Zhiqiang Gu, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 456 days.

(21) Appl. No.: 15/306,034

(22) PCT Filed: Apr. 21, 2014

(86) PCT No.: PCT/US2014/034791
§ 371 (c)(1),
(2) Date: Oct. 21, 2016

(87) PCT Pub. No.: WO2015/163842
PCT Pub. Date: Oct. 29, 2015

(65) Prior Publication Data
US 2017/0038905 A1     Feb. 9, 2017

(51) Int. Cl.
*G06F 3/041* (2006.01)
(52) U.S. Cl.
CPC .......... *G06F 3/0416* (2013.01); *G06F 3/0414* (2013.01); *G06F 2203/04102* (2013.01);
(Continued)
(58) Field of Classification Search
CPC ............... G06F 3/0414; G06F 3/0416; G06F 2203/04102; G06F 2203/04104; G06F 2203/04105; G06F 2203/04106
See application file for complete search history.

(56) References Cited

U.S. PATENT DOCUMENTS 3,001,049 A    9/1961  Didier
3,390,287 A    6/1968  Sonderegger
(Continued)

FOREIGN PATENT DOCUMENTS

AU    2015100710    7/2015
AU    2016100399    5/2016
(Continued)

OTHER PUBLICATIONS

Astronomer's Toolbox, "The Electromagnetic Spectrum," http://imagine.gsfc.nasa.gov/science/toolbox/emspectrum1.html, updated Mar. 2013, 4 pages.
(Continued)

*Primary Examiner* — Amare Mengistu
*Assistant Examiner* — Crystal Mathews
(74) *Attorney, Agent, or Firm* — Brownstein Hyatt Farber Schreck, LLP

(57) ABSTRACT

Systems and methods are disclosed herein for determining the amounts of force applied by at least two fingers of a user to a touch input device having a touch input surface. In one example, a system may include a plurality of force sensors distributed about the touch input surface; a plurality of touch sensors distributed about the touch input surface; and a module for apportioning a first amount of force as measured by the plurality of force sensors to one of the at least two fingers, and for apportioning a second amount of force as measured by the plurality of force sensors to another of the at least two fingers. The system may also include a persistent data structure including force calibration data with force deflection measurement values as measured by each of the plurality of force sensors in response to a standardized force applied to various known locations on the touch input surface. The system may also include one or more matched filter modules.

17 Claims, 14 Drawing Sheets

(52) U.S. Cl.
CPC .............. *G06F 2203/04104* (2013.01); *G06F 2203/04105* (2013.01); *G06F 2203/04106* (2013.01)

(56) References Cited

U.S. PATENT DOCUMENTS

| | | | |
|---|---|---|---|
| 3,419,739 A | 12/1968 | Clements |
| 4,236,132 A | 11/1980 | Zissimopoulos |
| 4,412,148 A | 10/1983 | Klicker et al. |
| 4,414,984 A | 11/1983 | Zarudiansky |
| 4,490,815 A | 12/1984 | Umehara et al. |
| 4,695,813 A | 9/1987 | Nobutoki et al. |
| 4,975,616 A | 12/1990 | Park |
| 5,010,772 A | 4/1991 | Bourland |
| 5,245,734 A | 9/1993 | Issartel |
| 5,283,408 A | 2/1994 | Chen |
| 5,293,161 A | 3/1994 | MacDonald et al. |
| 5,317,221 A | 5/1994 | Kubo et al. |
| 5,365,140 A | 11/1994 | Ohya et al. |
| 5,434,549 A | 7/1995 | Hirabayashi et al. |
| 5,436,622 A | 7/1995 | Gutman et al. |
| 5,510,584 A | 4/1996 | Norris |
| 5,510,783 A | 4/1996 | Findlater et al. |
| 5,513,100 A | 4/1996 | Parker et al. |
| 5,587,875 A | 12/1996 | Sellers |
| 5,590,020 A | 12/1996 | Sellers |
| 5,602,715 A | 2/1997 | Lempicki et al. |
| 5,619,005 A | 4/1997 | Shibukawa et al. |
| 5,621,610 A | 4/1997 | Moore et al. |
| 5,625,532 A | 4/1997 | Sellers |
| 5,629,578 A | 5/1997 | Winzer et al. |
| 5,635,928 A | 6/1997 | Takagi et al. |
| 5,718,418 A | 2/1998 | Gugsch |
| 5,739,759 A | 4/1998 | Nakazawa et al. |
| 5,742,242 A | 4/1998 | Sellers |
| 5,783,765 A | 7/1998 | Muramatsu |
| 5,793,605 A | 8/1998 | Sellers |
| 5,812,116 A | 9/1998 | Malhi |
| 5,813,142 A | 9/1998 | Demon |
| 5,818,149 A | 10/1998 | Safari et al. |
| 5,896,076 A | 4/1999 | Van Namen |
| 5,907,199 A | 5/1999 | Miller |
| 5,951,908 A | 9/1999 | Cui et al. |
| 5,959,613 A | 9/1999 | Rosenberg et al. |
| 5,973,441 A | 10/1999 | Lo et al. |
| 5,982,304 A | 11/1999 | Selker et al. |
| 5,982,612 A | 11/1999 | Roylance |
| 5,995,026 A | 11/1999 | Sellers |
| 5,999,084 A | 12/1999 | Armstrong |
| 6,069,433 A | 5/2000 | Lazarus et al. |
| 6,078,308 A | 6/2000 | Rosenberg et al. |
| 6,104,947 A | 8/2000 | Heikkila et al. |
| 6,127,756 A | 10/2000 | Iwaki |
| 6,135,886 A | 10/2000 | Armstrong |
| 6,198,206 B1 | 3/2001 | Saarmaa |
| 6,218,966 B1 | 4/2001 | Goodwin |
| 6,219,033 B1 | 4/2001 | Rosenberg |
| 6,220,550 B1 | 4/2001 | McKillip, Jr. |
| 6,222,525 B1 | 4/2001 | Armstrong |
| 6,252,336 B1 | 6/2001 | Hall |
| 6,342,880 B2 | 1/2002 | Rosenberg et al. |
| 6,351,205 B1 | 2/2002 | Armstrong |
| 6,373,465 B2 | 4/2002 | Jolly et al. |
| 6,408,187 B1 | 6/2002 | Merriam |
| 6,411,276 B1 | 6/2002 | Braun et al. |
| 6,429,849 B1 | 8/2002 | An |
| 6,437,485 B1 | 8/2002 | Johansson |
| 6,438,393 B1 | 8/2002 | Surronen |
| 6,444,928 B2 | 9/2002 | Okamoto et al. |
| 6,455,973 B1 | 9/2002 | Ineson |
| 6,465,921 B1 | 10/2002 | Horng |
| 6,552,404 B1 | 4/2003 | Hynes |
| 6,552,471 B1 | 4/2003 | Chandran et al. |
| 6,557,072 B2 | 4/2003 | Osborn |
| 6,642,857 B1 | 11/2003 | Schediwy |
| 6,693,626 B1 | 2/2004 | Rosenberg |
| 6,717,573 B1 | 4/2004 | Shahoian et al. |
| 6,747,400 B2 | 6/2004 | Maichl et al. |
| 6,809,462 B2 | 10/2004 | Pelrine et al. |
| 6,809,727 B2 | 10/2004 | Piot et al. |
| 6,864,877 B2 | 3/2005 | Braun et al. |
| 6,906,697 B2 | 6/2005 | Rosenberg |
| 6,906,700 B1 | 6/2005 | Armstrong |
| 6,906,703 B2 | 6/2005 | Vablais et al. |
| 6,952,203 B2 | 10/2005 | Banerjee et al. |
| 6,954,657 B2 | 10/2005 | Bork et al. |
| 6,963,762 B2 | 11/2005 | Kaaresoja et al. |
| 6,965,189 B2 | 11/2005 | Menzel |
| 6,995,752 B2 | 2/2006 | Lu |
| 7,005,811 B2 | 2/2006 | Wakuda et al. |
| 7,016,707 B2 | 3/2006 | Fujisawa et al. |
| 7,022,927 B2 | 4/2006 | Hsu |
| 7,023,112 B2 | 4/2006 | Miyamoto et al. |
| 7,081,701 B2 | 7/2006 | Yoon et al. |
| 7,091,948 B2 | 8/2006 | Chang et al. |
| 7,121,147 B2 | 10/2006 | Okada |
| 7,123,948 B2 | 10/2006 | Nielsen |
| 7,130,664 B1 | 10/2006 | Williams |
| 7,136,045 B2 | 11/2006 | Rosenberg et al. |
| 7,161,580 B2 | 1/2007 | Bailey et al. |
| 7,162,928 B2 | 1/2007 | Shank et al. |
| 7,170,498 B2 | 1/2007 | Huang |
| 7,176,906 B2 | 2/2007 | Williams et al. |
| 7,180,500 B2 | 2/2007 | Marvit et al. |
| 7,182,691 B1 | 2/2007 | Schena |
| 7,194,645 B2 | 3/2007 | Bieswanger et al. |
| 7,205,978 B2 | 4/2007 | Poupyrev |
| 7,217,891 B2 | 5/2007 | Fischer et al. |
| 7,218,310 B2 | 5/2007 | Tierling et al. |
| 7,219,561 B2 | 5/2007 | Okada |
| 7,253,350 B2 | 8/2007 | Noro et al. |
| 7,269,484 B2 | 9/2007 | Hein |
| 7,333,604 B2 | 2/2008 | Zernovizky et al. |
| 7,334,350 B2 | 2/2008 | Ellis |
| 7,348,968 B2 | 3/2008 | Dawson |
| 7,382,357 B2 | 6/2008 | Panotopoulos et al. |
| 7,388,741 B2 | 6/2008 | Konuma et al. |
| 7,392,066 B2 | 6/2008 | Hapamas |
| 7,423,631 B2 | 9/2008 | Shahoian et al. |
| 7,446,752 B2 | 11/2008 | Goldenberg et al. |
| 7,469,155 B2 | 12/2008 | Chu |
| 7,469,595 B2 | 12/2008 | Kessler et al. |
| 7,471,033 B2 | 12/2008 | Thiesen et al. |
| 7,495,358 B2 | 2/2009 | Kobayashi et al. |
| 7,508,382 B2 | 3/2009 | Denoue et al. |
| 7,561,142 B2 | 7/2009 | Shahoian et al. |
| 7,562,468 B2 | 7/2009 | Ellis |
| 7,569,086 B2 | 8/2009 | Chandran |
| 7,575,368 B2 | 8/2009 | Guillaume |
| 7,586,220 B2 | 9/2009 | Roberts |
| 7,619,498 B2 | 11/2009 | Miura |
| 7,639,232 B2 | 12/2009 | Grant et al. |
| 7,641,618 B2 | 1/2010 | Noda et al. |
| 7,647,196 B2 | 1/2010 | Kahn et al. |
| 7,649,305 B2 | 1/2010 | Priya et al. |
| 7,675,253 B2 | 3/2010 | Dorel |
| 7,675,414 B2 | 3/2010 | Ray |
| 7,679,611 B2 | 3/2010 | Schena |
| 7,707,742 B2 | 5/2010 | Ellis |
| 7,710,399 B2 | 5/2010 | Bruneau et al. |
| 7,732,951 B2 | 6/2010 | Mukaide |
| 7,737,828 B2 | 6/2010 | Yang et al. |
| 7,742,036 B2 | 6/2010 | Grant et al. |
| 7,788,032 B2 | 8/2010 | Moloney |
| 7,793,429 B2 | 9/2010 | Ellis |
| 7,793,430 B2 | 9/2010 | Ellis |
| 7,798,982 B2 | 9/2010 | Zets et al. |
| 7,868,489 B2 | 1/2011 | Amemiya et al. |
| 7,886,621 B2 | 2/2011 | Smith et al. |
| 7,888,892 B2 | 2/2011 | McReynolds et al. |
| 7,893,922 B2 | 2/2011 | Klinghult et al. |
| 7,919,945 B2 | 4/2011 | Houston et al. |
| 7,929,382 B2 | 4/2011 | Yamazaki |
| 7,946,483 B2 | 5/2011 | Miller et al. |

(56) References Cited

U.S. PATENT DOCUMENTS

| | | |
|---|---|---|
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,961,909 B2 | 6/2011 | Mandella et al. |
| 8,018,105 B2 | 9/2011 | Erixon et al. |
| 8,031,172 B2 | 10/2011 | Kruse et al. |
| 8,044,940 B2 | 10/2011 | Narusawa |
| 8,069,881 B1 | 12/2011 | Cunha |
| 8,072,418 B2 | 12/2011 | Crawford et al. |
| 8,077,145 B2 | 12/2011 | Rosenberg et al. |
| 8,081,156 B2 | 12/2011 | Ruettiger |
| 8,082,640 B2 | 12/2011 | Takeda |
| 8,084,968 B2 | 12/2011 | Murray et al. |
| 8,098,234 B2 | 1/2012 | Lacroix et al. |
| 8,123,660 B2 | 2/2012 | Kruse et al. |
| 8,125,453 B2 | 2/2012 | Shahoian et al. |
| 8,141,276 B2 | 3/2012 | Ellis |
| 8,156,809 B2 | 4/2012 | Tierling et al. |
| 8,169,401 B2 | 5/2012 | Hardwick |
| 8,174,344 B2 | 5/2012 | Yakima et al. |
| 8,174,372 B2 | 5/2012 | da Costa |
| 8,179,027 B2 | 5/2012 | Barta et al. |
| 8,179,202 B2 | 5/2012 | Cruz-Hernandez et al. |
| 8,188,623 B2 | 5/2012 | Park |
| 8,205,356 B2 | 6/2012 | Ellis |
| 8,210,942 B2 | 7/2012 | Shimabukuro et al. |
| 8,232,494 B2 | 7/2012 | Purcocks |
| 8,242,641 B2 | 8/2012 | Bae |
| 8,248,277 B2 | 8/2012 | Peterson et al. |
| 8,248,278 B2 | 8/2012 | Schlosser et al. |
| 8,253,686 B2 | 8/2012 | Kyung et al. |
| 8,255,004 B2 | 8/2012 | Huang et al. |
| 8,261,468 B2 | 9/2012 | Ellis |
| 8,264,465 B2 | 9/2012 | Grant et al. |
| 8,270,114 B2 | 9/2012 | Argumedo et al. |
| 8,288,899 B2 | 10/2012 | Park et al. |
| 8,291,614 B2 | 10/2012 | Ellis |
| 8,294,600 B2 | 10/2012 | Peterson et al. |
| 8,315,746 B2 | 11/2012 | Cox et al. |
| 8,339,250 B2 | 12/2012 | Je et al. |
| 8,344,834 B2 | 1/2013 | Niiyama |
| 8,345,013 B2 | 1/2013 | Heubel et al. |
| 8,373,549 B2 | 2/2013 | Fadell et al. |
| 8,378,797 B2 | 2/2013 | Pance et al. |
| 8,378,798 B2 | 2/2013 | Bells et al. |
| 8,378,965 B2 | 2/2013 | Gregorio et al. |
| 8,384,316 B2 | 2/2013 | Houston et al. |
| 8,384,679 B2 | 2/2013 | Paleczny et al. |
| 8,390,594 B2 | 3/2013 | Modarres et al. |
| 8,395,587 B2 | 3/2013 | Cauwels et al. |
| 8,398,570 B2 | 3/2013 | Mortimer et al. |
| 8,411,058 B2 | 4/2013 | Wong et al. |
| 8,446,264 B2 | 5/2013 | Tanase |
| 8,451,255 B2 | 5/2013 | Weber et al. |
| 8,452,345 B2 | 5/2013 | Lee et al. |
| 8,461,951 B2 | 6/2013 | Gassmann et al. |
| 8,466,889 B2 | 6/2013 | Tong et al. |
| 8,471,690 B2 | 6/2013 | Hennig et al. |
| 8,487,759 B2 | 7/2013 | Hill |
| 8,515,398 B2 | 8/2013 | Song et al. |
| 8,542,134 B2 | 9/2013 | Peterson et al. |
| 8,545,322 B2 | 10/2013 | George et al. |
| 8,547,341 B2 | 10/2013 | Takashima et al. |
| 8,547,350 B2 * | 10/2013 | Anglin .................. G06F 3/0414 178/18.01 |
| 8,552,859 B2 | 10/2013 | Pakula et al. |
| 8,570,291 B2 | 10/2013 | Motomura |
| 8,575,794 B2 | 11/2013 | Lee et al. |
| 8,587,955 B2 | 11/2013 | DiFonzo et al. |
| 8,593,409 B1 | 11/2013 | Heubel |
| 8,596,755 B2 | 12/2013 | Hibi |
| 8,598,893 B2 | 12/2013 | Camus |
| 8,599,047 B2 | 12/2013 | Schlosser et al. |
| 8,599,152 B1 | 12/2013 | Wurtenberger et al. |
| 8,600,354 B2 | 12/2013 | Esaki |
| 8,614,431 B2 | 12/2013 | Huppi et al. |
| 8,621,348 B2 | 12/2013 | Ramsay et al. |
| 8,629,843 B2 | 1/2014 | Steeves et al. |
| 8,633,916 B2 | 1/2014 | Bernstein et al. |
| 8,674,941 B2 | 3/2014 | Casparian et al. |
| 8,680,723 B2 | 3/2014 | Subramanian |
| 8,681,092 B2 | 3/2014 | Harada et al. |
| 8,682,396 B2 | 3/2014 | Yang et al. |
| 8,686,952 B2 | 4/2014 | Pope et al. |
| 8,710,966 B2 | 4/2014 | Hill |
| 8,723,813 B2 | 5/2014 | Park et al. |
| 8,735,755 B2 | 5/2014 | Peterson et al. |
| 8,760,273 B2 | 6/2014 | Casparian et al. |
| 8,780,060 B2 | 7/2014 | Maschmeyer et al. |
| 8,787,006 B2 | 7/2014 | Golko et al. |
| 8,797,152 B2 | 8/2014 | Henderson et al. |
| 8,798,534 B2 | 8/2014 | Rodriguez et al. |
| 8,803,842 B2 | 8/2014 | Wakasugi et al. |
| 8,816,981 B2 | 8/2014 | Kai et al. |
| 8,836,502 B2 | 9/2014 | Culbert et al. |
| 8,845,071 B2 | 9/2014 | Yamamoto et al. |
| 8,857,248 B2 | 10/2014 | Shih et al. |
| 8,860,562 B2 | 10/2014 | Hill |
| 8,861,776 B2 | 10/2014 | Lastrucci |
| 8,866,600 B2 | 10/2014 | Yang et al. |
| 8,890,666 B2 | 11/2014 | Parker et al. |
| 8,890,668 B2 | 11/2014 | Pance et al. |
| 8,918,215 B2 | 12/2014 | Bosscher et al. |
| 8,928,621 B2 | 1/2015 | Ciesla et al. |
| 8,947,383 B2 | 2/2015 | Ciesla et al. |
| 8,948,821 B2 | 2/2015 | Newham et al. |
| 8,952,937 B2 | 2/2015 | Shih et al. |
| 8,970,534 B2 | 3/2015 | Adachi et al. |
| 8,976,141 B2 | 3/2015 | Myers et al. |
| 9,008,730 B2 | 4/2015 | Kim et al. |
| 9,012,795 B2 | 4/2015 | Niu |
| 9,013,426 B2 | 4/2015 | Cole et al. |
| 9,019,088 B2 | 4/2015 | Zawacki et al. |
| 9,024,738 B2 | 5/2015 | Van Schyndel et al. |
| 9,035,887 B1 | 5/2015 | Prud'Hommeaux et al. |
| 9,072,576 B2 | 7/2015 | Nishiura |
| 9,083,821 B2 | 7/2015 | Hughes |
| 9,098,984 B2 | 8/2015 | Heubel et al. |
| 9,098,991 B2 | 8/2015 | Park et al. |
| 9,117,347 B2 | 8/2015 | Matthews |
| 9,122,325 B2 | 9/2015 | Peshkin et al. |
| 9,131,039 B2 | 9/2015 | Behles |
| 9,134,834 B2 | 9/2015 | Reshef |
| 9,158,379 B2 | 10/2015 | Cruz-Hernandez et al. |
| 9,178,509 B2 | 11/2015 | Bernstein |
| 9,189,932 B2 | 11/2015 | Kerdemelidis et al. |
| 9,201,458 B2 | 12/2015 | Hunt et al. |
| 9,202,355 B2 | 12/2015 | Hill |
| 9,219,401 B2 | 12/2015 | Kim et al. |
| 9,235,267 B2 | 1/2016 | Pope et al. |
| 9,274,601 B2 | 3/2016 | Faubert et al. |
| 9,274,602 B2 | 3/2016 | Garg et al. |
| 9,274,603 B2 | 3/2016 | Modarres et al. |
| 9,275,815 B2 | 3/2016 | Hoffmann |
| 9,293,054 B2 | 3/2016 | Bruni et al. |
| 9,300,181 B2 | 3/2016 | Maeda et al. |
| 9,310,906 B2 | 4/2016 | Yumiki et al. |
| 9,317,116 B2 | 4/2016 | Ullrich et al. |
| 9,317,118 B2 | 4/2016 | Puskarich |
| 9,317,154 B2 | 4/2016 | Perlin et al. |
| 9,318,942 B2 | 4/2016 | Sugita et al. |
| 9,325,230 B2 | 4/2016 | Yamada et al. |
| 9,330,544 B2 | 5/2016 | Levesque et al. |
| 9,357,052 B2 | 5/2016 | Ullrich |
| 9,360,944 B2 | 6/2016 | Pinault |
| 9,380,145 B2 | 6/2016 | Tartz et al. |
| 9,390,599 B2 | 7/2016 | Weinberg |
| 9,396,434 B2 | 7/2016 | Rothkopf |
| 9,405,369 B2 | 8/2016 | Modarres et al. |
| 9,411,423 B2 | 8/2016 | Heubel |
| 9,417,695 B2 | 8/2016 | Griffin et al. |
| 9,430,042 B2 | 8/2016 | Levin |
| 9,448,628 B2 | 9/2016 | Tan et al. |
| 9,448,713 B2 | 9/2016 | Cruz-Hernandez et al. |

(56) References Cited

U.S. PATENT DOCUMENTS

| | | | |
|---|---|---|---|
| 9,449,476 B2 | 9/2016 | Lynn | |
| 9,454,239 B2 | 9/2016 | Elias et al. | |
| 9,467,033 B2 | 10/2016 | Jun et al. | |
| 9,468,846 B2 | 10/2016 | Terrell et al. | |
| 9,471,172 B2 | 10/2016 | Sirois | |
| 9,480,947 B2 | 11/2016 | Jiang et al. | |
| 9,501,912 B1 | 11/2016 | Hayskjold et al. | |
| 9,544,694 B2 | 1/2017 | Abe et al. | |
| 9,576,445 B2 | 2/2017 | Cruz-Hernandez | |
| 9,595,659 B2 | 3/2017 | Kim | |
| 9,600,070 B2 | 3/2017 | Chatterjee et al. | |
| 9,622,214 B2 | 4/2017 | Ryu | |
| 9,659,482 B2 | 5/2017 | Yang et al. | |
| 9,594,450 B2 | 7/2017 | Lynn et al. | |
| 9,727,157 B2 | 8/2017 | Ham et al. | |
| 9,778,743 B2 | 10/2017 | Grant et al. | |
| 9,779,592 B1 | 10/2017 | Hoen | |
| 9,823,833 B2 | 11/2017 | Grant et al. | |
| 9,934,661 B2 | 4/2018 | Hill | |
| 9,990,099 B2 | 6/2018 | Ham et al. | |
| 10,061,386 B2 | 8/2018 | Frescas et al. | |
| 10,062,832 B2 | 8/2018 | Caraveo et al. | |
| 10,067,585 B2 | 9/2018 | Kim | |
| 10,139,907 B2 | 11/2018 | Billington | |
| 10,204,494 B2 | 2/2019 | Do et al. | |
| 10,338,682 B2 | 7/2019 | Heubel et al. | |
| 10,345,905 B2 | 7/2019 | McClure et al. | |
| 10,367,950 B2 | 7/2019 | Davis et al. | |
| 2002/0194284 A1 | 12/2002 | Haynes | |
| 2003/0210259 A1 | 11/2003 | Liu | |
| 2003/0214485 A1* | 11/2003 | Roberts | G06F 3/0414 345/173 |
| 2004/0021663 A1 | 2/2004 | Suzuki et al. | |
| 2004/0127198 A1 | 7/2004 | Roskind et al. | |
| 2005/0057528 A1 | 3/2005 | Kleen | |
| 2005/0107129 A1 | 5/2005 | Kaewell et al. | |
| 2005/0110778 A1 | 5/2005 | Ben Ayed | |
| 2005/0118922 A1 | 6/2005 | Endo | |
| 2005/0217142 A1 | 10/2005 | Ellis | |
| 2005/0237306 A1 | 10/2005 | Klein et al. | |
| 2005/0248549 A1 | 11/2005 | Dietz et al. | |
| 2005/0258715 A1 | 11/2005 | Schlabach | |
| 2006/0014569 A1 | 1/2006 | DelGiorno | |
| 2006/0154674 A1 | 7/2006 | Landschaft et al. | |
| 2006/0209037 A1 | 9/2006 | Wang et al. | |
| 2006/0239746 A1 | 10/2006 | Grant | |
| 2006/0252463 A1 | 11/2006 | Liao | |
| 2007/0032270 A1 | 2/2007 | Orr | |
| 2007/0043725 A1 | 2/2007 | Hotelling et al. | |
| 2007/0099574 A1 | 5/2007 | Wang | |
| 2007/0152974 A1 | 7/2007 | Kim et al. | |
| 2007/0168430 A1 | 7/2007 | Brun et al. | |
| 2007/0178942 A1 | 8/2007 | Sadler et al. | |
| 2007/0188450 A1 | 8/2007 | Hernandez et al. | |
| 2008/0084384 A1 | 4/2008 | Gregorio et al. | |
| 2008/0165148 A1 | 7/2008 | Williamson | |
| 2008/0181501 A1 | 7/2008 | Faraboschi | |
| 2008/0181706 A1 | 7/2008 | Jackson | |
| 2008/0192014 A1 | 8/2008 | Kent et al. | |
| 2008/0204428 A1 | 8/2008 | Pierce et al. | |
| 2008/0255794 A1 | 10/2008 | Levine | |
| 2009/0002328 A1 | 1/2009 | Ullrich et al. | |
| 2009/0015560 A1 | 1/2009 | Robinson et al. | |
| 2009/0115734 A1 | 5/2009 | Fredriksson et al. | |
| 2009/0120105 A1 | 5/2009 | Ramsay et al. | |
| 2009/0128503 A1 | 5/2009 | Grant et al. | |
| 2009/0135142 A1 | 5/2009 | Fu et al. | |
| 2009/0167702 A1 | 7/2009 | Nurmi | |
| 2009/0167704 A1 | 7/2009 | Terlizzi et al. | |
| 2009/0218148 A1 | 9/2009 | Hugeback et al. | |
| 2009/0225046 A1 | 9/2009 | Kim et al. | |
| 2009/0236210 A1 | 9/2009 | Clark et al. | |
| 2009/0267892 A1 | 10/2009 | Faubert | |
| 2009/0291670 A1 | 11/2009 | Sennett et al. | |
| 2009/0313542 A1 | 12/2009 | Cruz-Hernandez et al. | |
| 2010/0020036 A1 | 1/2010 | Hui et al. | |
| 2010/0053087 A1 | 3/2010 | Dai et al. | |
| 2010/0053116 A1 | 3/2010 | Daverman et al. | |
| 2010/0079264 A1 | 4/2010 | Hoellwarth | |
| 2010/0089735 A1 | 4/2010 | Takeda et al. | |
| 2010/0110018 A1 | 5/2010 | Faubert et al. | |
| 2010/0141408 A1 | 6/2010 | Doy et al. | |
| 2010/0141606 A1 | 6/2010 | Bae et al. | |
| 2010/0148944 A1 | 6/2010 | Kim et al. | |
| 2010/0152620 A1 | 6/2010 | Ramsay et al. | |
| 2010/0164894 A1 | 7/2010 | Kim et al. | |
| 2010/0188422 A1 | 7/2010 | Shingai et al. | |
| 2010/0207906 A1* | 8/2010 | Anglin | G06F 3/0414 345/174 |
| 2010/0231508 A1 | 9/2010 | Cruz-Hernandez et al. | |
| 2010/0231550 A1 | 9/2010 | Cruz-Hernandez et al. | |
| 2010/0265197 A1 | 10/2010 | Purdy | |
| 2010/0309141 A1 | 12/2010 | Cruz-Hernandez et al. | |
| 2010/0328229 A1 | 12/2010 | Weber et al. | |
| 2011/0007023 A1* | 1/2011 | Abrahamsson | G02F 1/13338 345/174 |
| 2011/0051334 A1* | 3/2011 | Griffith | G06F 3/03547 361/679.01 |
| 2011/0053577 A1 | 3/2011 | Lee et al. | |
| 2011/0084912 A1* | 4/2011 | Almalki | G06F 3/041 345/173 |
| 2011/0107958 A1 | 5/2011 | Pance et al. | |
| 2011/0121765 A1 | 5/2011 | Anderson et al. | |
| 2011/0128239 A1 | 6/2011 | Polyakov et al. | |
| 2011/0148608 A1 | 6/2011 | Grant et al. | |
| 2011/0157052 A1 | 6/2011 | Lee et al. | |
| 2011/0163985 A1 | 7/2011 | Bae et al. | |
| 2011/0193824 A1 | 8/2011 | Modarres et al. | |
| 2011/0216013 A1 | 9/2011 | Siotis | |
| 2011/0248941 A1 | 10/2011 | Abdo et al. | |
| 2011/0248948 A1 | 10/2011 | Griffin et al. | |
| 2011/0260988 A1 | 10/2011 | Colgate et al. | |
| 2011/0263200 A1 | 10/2011 | Thornton et al. | |
| 2011/0291950 A1 | 12/2011 | Tong | |
| 2011/0304559 A1 | 12/2011 | Pasquero | |
| 2012/0068957 A1 | 3/2012 | Puskarich et al. | |
| 2012/0075198 A1 | 3/2012 | Sulem et al. | |
| 2012/0086659 A1* | 4/2012 | Perlin | G06F 3/005 345/173 |
| 2012/0086666 A1* | 4/2012 | Badaye | G06F 3/044 345/174 |
| 2012/0092263 A1 | 4/2012 | Peterson et al. | |
| 2012/0126959 A1 | 5/2012 | Zarrabi et al. | |
| 2012/0127088 A1 | 5/2012 | Pance et al. | |
| 2012/0133494 A1 | 5/2012 | Cruz-Hernandez et al. | |
| 2012/0139844 A1 | 6/2012 | Ramstein et al. | |
| 2012/0206248 A1 | 8/2012 | Biggs | |
| 2012/0256848 A1 | 10/2012 | Madabusi Srinivasan | |
| 2012/0274578 A1 | 11/2012 | Snow et al. | |
| 2012/0280927 A1* | 11/2012 | Ludwig | G06F 3/041 345/173 |
| 2012/0319987 A1 | 12/2012 | Woo | |
| 2012/0327006 A1 | 12/2012 | Israr et al. | |
| 2013/0027345 A1 | 1/2013 | Binzel | |
| 2013/0033967 A1 | 2/2013 | Chuang et al. | |
| 2013/0043987 A1 | 2/2013 | Kasama et al. | |
| 2013/0058816 A1 | 3/2013 | Kim | |
| 2013/0063356 A1 | 3/2013 | Martisauskas | |
| 2013/0082970 A1* | 4/2013 | Frey | G06F 3/0414 345/173 |
| 2013/0106699 A1 | 5/2013 | Babatunde | |
| 2013/0141365 A1 | 6/2013 | Lynn et al. | |
| 2013/0191741 A1 | 7/2013 | Dickinson et al. | |
| 2013/0207793 A1 | 8/2013 | Weaber et al. | |
| 2013/0217491 A1 | 8/2013 | Hilbert et al. | |
| 2013/0222280 A1 | 8/2013 | Sheynblat et al. | |
| 2013/0228023 A1 | 9/2013 | Drasnin et al. | |
| 2013/0261811 A1 | 10/2013 | Yagi et al. | |
| 2013/0300590 A1 | 11/2013 | Dietz et al. | |
| 2014/0035397 A1 | 2/2014 | Endo et al. | |
| 2014/0082490 A1 | 3/2014 | Jung et al. | |
| 2014/0085065 A1 | 3/2014 | Biggs et al. | |
| 2014/0143785 A1 | 5/2014 | Mistry et al. | |

(56) References Cited

U.S. PATENT DOCUMENTS

| | | | |
|---|---|---|---|
| 2014/0168153 A1* | 6/2014 | Deichmann | G06F 3/044 345/174 |
| 2014/0168162 A1* | 6/2014 | Liao | G06F 3/042 345/175 |
| 2014/0197936 A1 | 7/2014 | Biggs et al. | |
| 2014/0232534 A1 | 8/2014 | Birnbaum et al. | |
| 2014/0267076 A1 | 9/2014 | Birnbaum et al. | |
| 2014/0320436 A1* | 10/2014 | Modarres | G06F 3/0412 345/173 |
| 2014/0354585 A1* | 12/2014 | Cok | G06F 3/0414 345/174 |
| 2014/0368260 A1* | 12/2014 | Tanada | G06F 3/04883 327/517 |
| 2015/0005039 A1 | 1/2015 | Liu et al. | |
| 2015/0040005 A1 | 2/2015 | Faaborg | |
| 2015/0042610 A1* | 2/2015 | Takano | G06F 3/044 345/174 |
| 2015/0090572 A1 | 4/2015 | Lee et al. | |
| 2015/0098309 A1 | 4/2015 | Adams et al. | |
| 2015/0169059 A1 | 6/2015 | Behles et al. | |
| 2015/0192414 A1 | 7/2015 | Das et al. | |
| 2015/0194165 A1 | 7/2015 | Faaborg et al. | |
| 2015/0205355 A1 | 7/2015 | Yairi | |
| 2015/0205417 A1 | 7/2015 | Yairi et al. | |
| 2015/0220199 A1 | 8/2015 | Wang et al. | |
| 2015/0227204 A1 | 8/2015 | Gipson et al. | |
| 2015/0296480 A1 | 10/2015 | Kinsey et al. | |
| 2015/0324049 A1 | 11/2015 | Kies et al. | |
| 2015/0349619 A1 | 12/2015 | Degner et al. | |
| 2016/0049265 A1 | 2/2016 | Bernstein | |
| 2016/0063826 A1 | 3/2016 | Morrell et al. | |
| 2016/0071384 A1 | 3/2016 | Hill | |
| 2016/0103544 A1* | 4/2016 | Filiz | G06F 3/0414 345/174 |
| 2016/0103545 A1* | 4/2016 | Filiz | G01L 1/18 345/174 |
| 2016/0162025 A1 | 6/2016 | Shah | |
| 2016/0163165 A1 | 6/2016 | Morrell et al. | |
| 2016/0172953 A1 | 6/2016 | Degner et al. | |
| 2016/0195929 A1 | 7/2016 | Martinez et al. | |
| 2016/0196935 A1 | 7/2016 | Bernstein | |
| 2016/0206921 A1 | 7/2016 | Szabados et al. | |
| 2016/0211736 A1 | 7/2016 | Moussette et al. | |
| 2016/0216764 A1 | 7/2016 | Morrell et al. | |
| 2016/0216766 A1 | 7/2016 | Puskarich | |
| 2016/0231815 A1 | 8/2016 | Moussette et al. | |
| 2016/0233012 A1 | 8/2016 | Lubinski et al. | |
| 2016/0241119 A1 | 8/2016 | Keeler | |
| 2016/0259480 A1 | 9/2016 | Augenbergs et al. | |
| 2016/0306423 A1 | 10/2016 | Uttermann et al. | |
| 2016/0371942 A1* | 12/2016 | Smith, IV | G06F 1/163 |
| 2016/0378255 A1* | 12/2016 | Butler | G01L 1/146 345/174 |
| 2017/0070131 A1* | 3/2017 | Degner | H02K 33/16 |
| 2017/0084138 A1 | 3/2017 | Hajati et al. | |
| 2017/0085163 A1 | 3/2017 | Hajati et al. | |
| 2017/0090667 A1* | 3/2017 | Abdollahian | G06F 3/0418 |
| 2017/0153703 A1 | 6/2017 | Yun et al. | |
| 2017/0192507 A1 | 7/2017 | Lee et al. | |
| 2017/0192508 A1 | 7/2017 | Lim et al. | |
| 2017/0242541 A1* | 8/2017 | Iuchi | G06F 3/0412 |
| 2017/0255295 A1 | 9/2017 | Tanemura et al. | |
| 2017/0257844 A1 | 9/2017 | Miller et al. | |
| 2017/0285747 A1* | 10/2017 | Chen | G08B 6/00 |
| 2017/0311282 A1 | 10/2017 | Miller et al. | |
| 2017/0315618 A1 | 11/2017 | Ullrich et al. | |
| 2017/0345992 A1 | 11/2017 | Noguchi | |
| 2017/0357325 A1 | 12/2017 | Yang et al. | |
| 2017/0364158 A1 | 12/2017 | Wen et al. | |
| 2018/0052550 A1 | 2/2018 | Zhang et al. | |
| 2018/0060941 A1* | 3/2018 | Yang | G06Q 30/0637 |
| 2018/0075715 A1 | 3/2018 | Morrell et al. | |
| 2018/0081441 A1 | 3/2018 | Pedder et al. | |
| 2018/0174409 A1 | 6/2018 | Hill | |
| 2018/0203513 A1 | 7/2018 | Rihn | |
| 2018/0302881 A1 | 10/2018 | Miller et al. | |
| 2019/0027674 A1 | 1/2019 | Zhang et al. | |
| 2019/0159170 A1 | 5/2019 | Miller et al. | |
| 2019/0214895 A1 | 7/2019 | Moussette et al. | |
| 2019/0250713 A1 | 8/2019 | Chen | |

FOREIGN PATENT DOCUMENTS

| | | |
|---|---|---|
| CA | 2355434 | 2/2002 |
| CN | 1324030 | 11/2001 |
| CN | 1692371 | 11/2005 |
| CN | 1817321 | 8/2006 |
| CN | 101120290 | 2/2008 |
| CN | 101409164 | 4/2009 |
| CN | 101763192 | 6/2010 |
| CN | 101903848 | 12/2010 |
| CN | 101938207 | 1/2011 |
| CN | 102025257 | 4/2011 |
| CN | 201829004 | 5/2011 |
| CN | 102163076 | 8/2011 |
| CN | 102246122 | 11/2011 |
| CN | 102315747 | 1/2012 |
| CN | 102591512 | 7/2012 |
| CN | 102667681 | 9/2012 |
| CN | 102713805 | 10/2012 |
| CN | 102768593 | 11/2012 |
| CN | 102844972 | 12/2012 |
| CN | 102915111 | 2/2013 |
| CN | 103019569 | 4/2013 |
| CN | 103154867 | 6/2013 |
| CN | 103181090 | 6/2013 |
| CN | 103218104 | 7/2013 |
| CN | 103278173 | 9/2013 |
| CN | 103416043 | 11/2013 |
| CN | 103440076 | 12/2013 |
| CN | 103567135 | 2/2014 |
| CN | 103970339 | 8/2014 |
| CN | 104220963 | 12/2014 |
| CN | 104956244 | 9/2015 |
| CN | 105556268 | 5/2016 |
| DE | 19517630 | 11/1996 |
| DE | 10330024 | 1/2005 |
| DE | 102009038103 | 2/2011 |
| DE | 102011115762 | 4/2013 |
| EP | 0483955 | 5/1992 |
| EP | 1047258 | 10/2000 |
| EP | 1686776 | 8/2006 |
| EP | 2060967 | 5/2009 |
| EP | 2073099 | 6/2009 |
| EP | 2194444 | 6/2010 |
| EP | 2207080 | 7/2010 |
| EP | 2264562 A2 | 12/2010 |
| EP | 2315186 | 4/2011 |
| EP | 2374430 | 10/2011 |
| EP | 2395414 | 12/2011 |
| EP | 2461228 | 6/2012 |
| EP | 2631746 | 8/2013 |
| EP | 2434555 | 10/2013 |
| JP | H05301342 A2 | 11/1993 |
| JP | 2002199689 | 7/2002 |
| JP | 2002102799 | 9/2002 |
| JP | 200362525 | 3/2003 |
| JP | 2003527046 | 9/2003 |
| JP | 200494389 | 3/2004 |
| JP | 2004236202 | 8/2004 |
| JP | 2006150865 | 6/2006 |
| JP | 3831410 | 10/2006 |
| JP | 2007519099 | 7/2007 |
| JP | 200818928 | 1/2008 |
| JP | 2010536040 | 11/2010 |
| JP | 2010272903 | 12/2010 |
| JP | 2011523840 | 8/2011 |
| JP | 2012135755 | 7/2012 |
| JP | 2013149124 | 8/2013 |
| JP | 2014002729 | 1/2014 |
| JP | 2014509028 | 4/2014 |
| JP | 2014235133 | 12/2014 |
| JP | 2014239323 | 12/2014 |

(56) References Cited

FOREIGN PATENT DOCUMENTS

| | | |
|---|---|---|
| JP | 2015153406 | 8/2015 |
| JP | 2015228214 | 12/2015 |
| JP | 2016095552 | 5/2016 |
| KR | 20050033909 | 4/2005 |
| KR | 1020100046602 | 5/2010 |
| KR | 1020110101516 | 9/2011 |
| KR | 20130024420 | 3/2013 |
| TW | 200518000 | 11/2007 |
| TW | 200951944 | 12/2009 |
| TW | 201145336 | 12/2011 |
| TW | 201218039 | 5/2012 |
| TW | 201425180 | 7/2014 |
| WO | WO 97/16932 | 5/1997 |
| WO | WO 00/051190 | 8/2000 |
| WO | WO 01/059588 | 8/2001 |
| WO | WO 01/089003 | 11/2001 |
| WO | WO 02/073587 | 9/2002 |
| WO | WO 03/038800 | 5/2003 |
| WO | WO 03/100550 | 12/2003 |
| WO | WO 06/057770 | 6/2006 |
| WO | WO 07/114631 | 10/2007 |
| WO | WO 08/075082 | 6/2008 |
| WO | WO 09/038862 | 3/2009 |
| WO | WO 09/068986 | 6/2009 |
| WO | WO 09/097866 | 8/2009 |
| WO | WO 09/122331 | 10/2009 |
| WO | WO 09/150287 | 12/2009 |
| WO | WO 10/085575 | 7/2010 |
| WO | WO 10/087925 | 8/2010 |
| WO | WO 11/007263 | 1/2011 |
| WO | WO 12/052635 | 4/2012 |
| WO | WO 12/129247 | 9/2012 |
| WO | WO 13/069148 | 5/2013 |
| WO | WO 13/150667 | 10/2013 |
| WO | WO 13/169302 | 11/2013 |
| WO | WO 13/173838 | 11/2013 |
| WO | WO 13/186846 | 12/2013 |
| WO | WO 13/186847 | 12/2013 |
| WO | WO 14/018086 | 1/2014 |
| WO | WO 14/098077 | 6/2014 |
| WO | WO 13/169299 | 11/2014 |
| WO | WO 15/023670 | 2/2015 |
| WO | WO 16/141482 | 9/2016 |

OTHER PUBLICATIONS

Hasser et al., "Preliminary Evaluation of a Shape-Memory Alloy Tactile Feedback Display," Advances in Robotics, Mechantronics, and Haptic Interfaces, ASME, DSC-vol. 49, pp. 73-80, 1993.

Hill et al., "Real-time Estimation of Human Impedance for Haptic Interfaces," Stanford Telerobotics Laboratory, Department of Mechanical Engineering, Stanford University, Third Joint Eurohaptics Conference and Symposium on Haptic Interfaces for Virtual Environment and Teleoperator Systems, Salt Lake City, Utah, Mar. 18-20, 2009, pp. 440-445.

Kim et al., "Tactile Rendering of 3D Features on Touch Surfaces," UIST '13, Oct. 8-11, 2013, St. Andrews, United Kingdom, 8 pages.

Lee et al, "Haptic Pen: Tactile Feedback Stylus for Touch Screens," Mitsubishi Electric Research Laboratories, http://wwwlmerl.com, 6 pages, Oct. 2004.

Actuator definition downloaded from http://www.thefreedictionary.com/actuator on May 3, 2018, 2 pages.

International Search Report and Written Opinion dated Oct. 17, 2014, PCT/US2014/034791, 11 pages.

Nakamura, "A Torso Haptic Display Based on Shape Memory Alloy Actuators," Massachusetts Institute of Technology, 2003, pp. 1-123.

U.S. Appl. No. 16/259,645, filed Jan. 28, 2019, Miller et al.

U.S. Appl. No. 16/352,784, filed Mar. 13, 2019, Moussette et al.

PuntoCellulare, "LG-GD910 3G Watch Phone," YouTube (http://www.youtube.com/watch?v+HcCI87KIELM), Jan. 8, 2009, 9 pages.

Sullivan, Mark, "This Android Wear Update Turns Your Device into the Dick Tracy Watch," Fast Company (https://www.fastcompany.com/3056319/this-android-wear-update-turns-your-device-into-the-dick-tracy-watch), Feb. 4, 2016, 9 pages.

U.S. Appl. No. 15/102,826, filed Jun. 8, 2016, Smith et al.

U.S. Appl. No. 15/251,459, filed Aug. 30, 2016, Miller et al.

U.S. Appl. No. 15/260,047, filed Sep. 8, 2016, Degner.

U.S. Appl. No. 15/364,822, filed Nov. 30, 2016, Chen.

U.S. Appl. No. 15/800,630, filed Nov. 1, 2017, Morrell et al.

U.S. Appl. No. 15/881,476, filed Jan. 26, 2018, Moussette et al.

U.S. Appl. No. 16/015,367, filed Jun. 22, 2018, Miller et al.

* cited by examiner

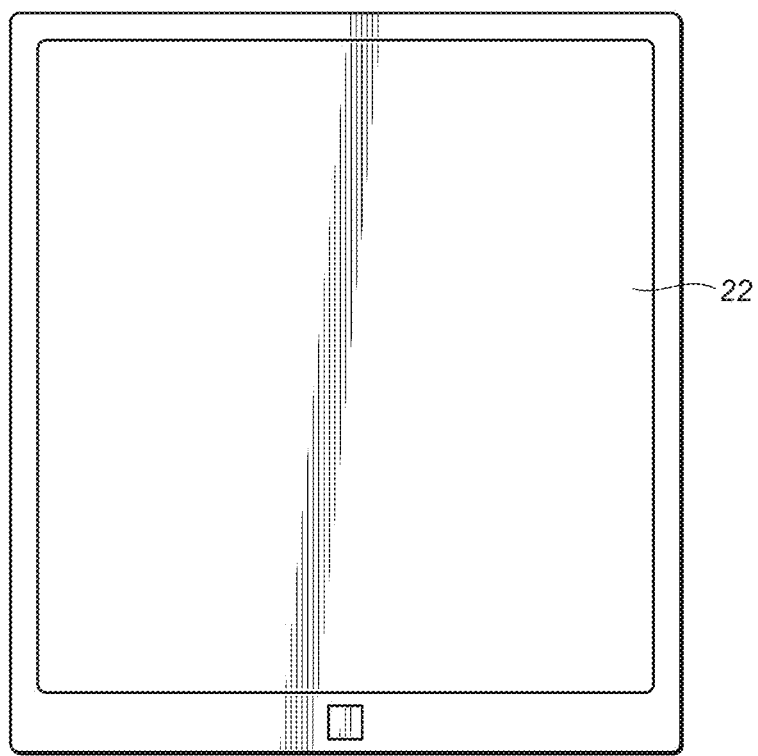
FIG. 1

APPORTIONMENT OF FORCES FOR MULTI-TOUCH INPUT DEVICES OF ELECTRONIC DEVICES

CROSS REFERENCE TO RELATED APPLICATION

This application is a 35 U.S.C. § 371 application of PCT/US2014/034791, filed on Apr. 21, 2014, and entitled "Apportionment of Forces for Multi-Touch Input Devices of Electronic Devices," which is incorporated by reference as if fully disclosed herein.

TECHNICAL FIELD

This disclosure relates, in general, to input devices for electronic devices, and more particularly, to touch input devices such as touch screens or track pads.

BACKGROUND

Electronic devices, such as computing devices, have various input mechanisms such as keyboards, touchscreens, track pads, and so on, which users utilize to access and control the computing device.

In a typical touch-based input device, such as a track pad or touch screen, a user can move his finger across an input surface of the touch-based input device. In response, the touch-based input device detects the finger's movement. In some touch-based input devices (for example, track pads and certain mice), the device may also detect, in binary fashion, when the user presses downwardly on the input surface, such as to select or engage a button or control displayed on the computing device. Generally, however, such devices do not register or process a range of inputs that can be correlated to a range of forces exerted on the input surface.

Further with respect to typical touch-based input devices, if a user depresses the input surface with two fingers in differing locations, the input surface cannot determine forces applied by the two fingers and cannot assign forces (or estimates of forces) separately to each region touched by the user. That is, touch-based input devices, even those that have some force-sensing capability, generally cannot partition forces between multiple simultaneous inputs.

As recognized by the present inventors, what is needed are methods and systems for detecting multi-touch inputs from users on electronic devices and apportioning the forces detected among multiple finger inputs.

SUMMARY

According to one broad aspect of an embodiment of the present disclosure, disclosed herein is a system for determining the amounts of force applied by at least two fingers of a user to a touch input device having a touch input surface. In one example the system may include a plurality of force sensors distributed about the touch input surface; a plurality of touch sensors distributed about the touch input surface; and a module for apportioning a first amount of force as measured by the plurality of force sensors to one of the at least two fingers, and for apportioning a second amount of force as measured by the plurality of force sensors to another of the at least two fingers.

In one example, the system may also include a persistent data structure including force calibration data. The force calibration data may include force deflection measurement values as measured by each of the plurality of force sensors in response to a standardized force applied to various known locations on the touch input surface.

In another example, the system may include one or more matched filter modules. The module for apportioning may include a matched filter module.

In one example, the touch sensors may detect one or more locations of one or more touches that occur simultaneously on the touch input surface. The module for apportioning may provide force data related to an amount of force applied by one of the at least two fingers on the touch input surface, and may provide force data related to an amount of force applied by another of the at least two fingers on the touch input surface. The module may examine an amount of force measured at each of the plurality of force sensors in relations to the force calibration data.

In one example, the touch input surface may include a flexible layer, such as a flexible glass or transparent layer, that deflects in response to the force applied by the at least two fingers of the user.

The touch input device may be in various forms, such as a track pad, a touch screen, or other touch input device.

According to another broad aspect of an embodiment of the present disclosure, disclosed herein is a method for determining amounts of forces applied by at least two fingers of a user to a touch input surface of an electronic device having a plurality of force sensors associated with the touch input surface. In one example, the method may include providing calibration data for the electronic device, the calibration data including force deflection measurement values as measured by each of the plurality of force sensors in response to a standardized force applied to a plurality of varied known locations on the touch input surface; detecting a first touch at a first location; detecting a second touch at a second location; obtaining force data measured by the plurality of force sensors; apportioning a first amount of force as measured by the plurality of force sensors to one of the at least two fingers; and apportioning a second amount of force as measured by the plurality of force sensors to another of the at least two fingers.

The electronic device may take various forms, such as a smart phone, tablet computing device, portable computing device, or other forms.

According to another broad aspect of an embodiment of the present disclosure, disclosed herein is an electronic device comprising a processor; a memory including a persistent memory, the memory coupled with the processor; a flexible touch input surface which deforms in response to one or more touches applied by at least two fingers of a user to the touch input surface; a plurality of touch sensors distributed about the touch input surface, the touch sensors detecting one or more locations of the one or more touches that occur simultaneously on the touch input surface; a plurality of force sensors distributed about the touch input surface; and a module for apportioning a first amount of force as measured by the plurality of force sensors to one of the at least two fingers, and for apportioning a second amount of force as measured by the plurality of force sensors to another of the at least two fingers.

In one example, the persistent memory may include force calibration data having a plurality of force deflection measurement values as measured by each of the plurality of force sensors in response to a standardized force applied to a plurality of varied known locations on the touch input surface. The module for apportioning may include a matched filter module. In another example, the module for apportioning may provide force data related to an amount of force applied by one of the at least two fingers on the touch input surface, and may provide force data related to an amount of force applied by another of the at least two fingers on the touch input surface. The module may examine an amount of force measured at each of the plurality of force sensors in relations to the force calibration data.

Other embodiments of the disclosure are described herein. The features, utilities and advantages of various embodiments of this disclosure will be apparent from the following more particular description of embodiments as illustrated in the accompanying drawings.

BRIEF DESCRIPTION OF THE DRAWINGS

FIG. 1 illustrates an example of an electronic device with a flexible touchscreen, in accordance with one embodiment of the present disclosure.

DETAILED DESCRIPTION

Disclosed herein are various examples of mechanisms to detect the location and the amount of force imparted by one or multiple fingers of a user onto a touch-sensing input surface of an electronic device. The mechanisms can provide, as outputs, coordinates of the location of a user's fingers on the touch input device when a depression was detected, as well as values representing the forces of each of the depressions attributable to each user's fingers. In this manner, if a user depresses the touch input device with two fingers simultaneously in different locations with the same or differing amounts of force, embodiments of the present disclosure can detect those two depressions, determine the coordinates of both depressions, and determine the amounts of force corresponding to each of the two depressions.

Figure 2:
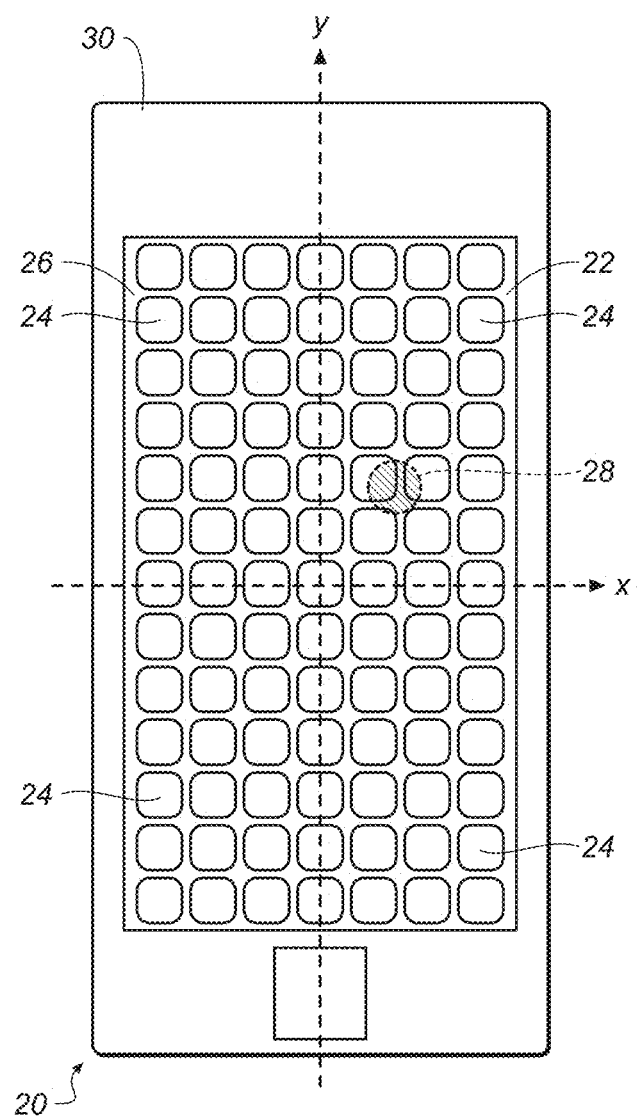
FIG. 2 illustrates an example of an electronic device having a plurality of force sensors distributed under the flexible touchscreen, in accordance with one embodiment of the present disclosure.
Figure 9:
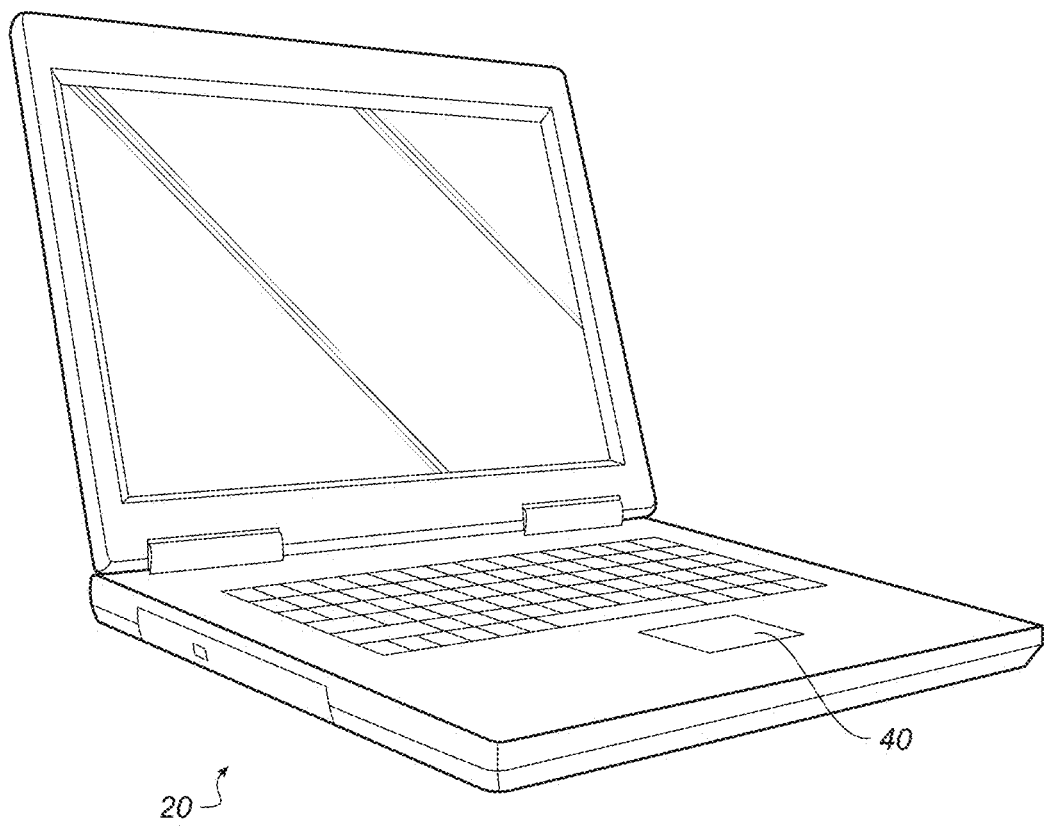
FIG. 9 illustrates an example of another electronic device having a touch input surface which may incorporate embodiments of the present disclosure.

Embodiments of the present disclosure can be utilized in various electronic devices, such as (in one non-limiting example) as or in conjunction with a touchscreen of a mobile phone or tablet computer or other portable electronic device (see, e.g., devices 20 in FIGS. 1-2, 9). In another example, a touchpad/trackpad input device can be formed utilizing one or more features, operations, or structures of the present disclosure.

In one example, the greater the force used by the user in depressing the input device, the more quickly a corresponding action occurs in the electronic device, such as scrolling faster, moving faster through a video, highlighting text in a quicker manner, and the like.

Referring to FIGS. 1-2, in one example, an electronic device 20 having a touch-sensing input surface 22 is provided with a plurality or array of force sensors 24 (FIG. 2). For instance, force sensors 24 may be arranged as a perimeter array of sensors, a full array of sensors distributed about the surface 22 of an electronic device 20, or any combination thereof. The sensor locations are known and fixed relative to the touch input surface 22 of an electronic device 20. The force sensors 24 may be one or more strain gauges, capacitive force sensors, pressure sensors, and the like. For example, one embodiment may employ capacitive plates aligned parallel to one another, such that a force exerted on the input surface 22 moves the plates closer to one another. This change in distance between the plates may yield an increased capacitance between the plates. The changes in capacitance may, in turn, be correlated to an amount of force exerted on the input surface 22.

Generally, it should be appreciated that the embodiments disclosed herein may be used with any type of force sensor, and so the foregoing examples are intended to be non-limiting.

An electronic device 20 may include a touch input surface 22, such as a touchscreen. In one example and referring to FIG. 2, a touch input surface 22 of an electronic device 20 may include a flexible glass or transparent layer 26, a plurality of touch location sensors (an example of a touch location that has been detected by a touch location sensor is shown in FIG. 2 as 28), and a plurality of force sensors 24 distributed proximate the touch input surface. The flexible glass layer 26 may have, in one example, portions (e.g., edges) that are suspended relative to the main body or housing 30 of the electronic device 20, and the flexible glass portion 26 may deflect or bend upon a user applying or depressing the touch input surface 22 using one or more fingers at one or more locations on the touch input surface 22.

Figure 7:
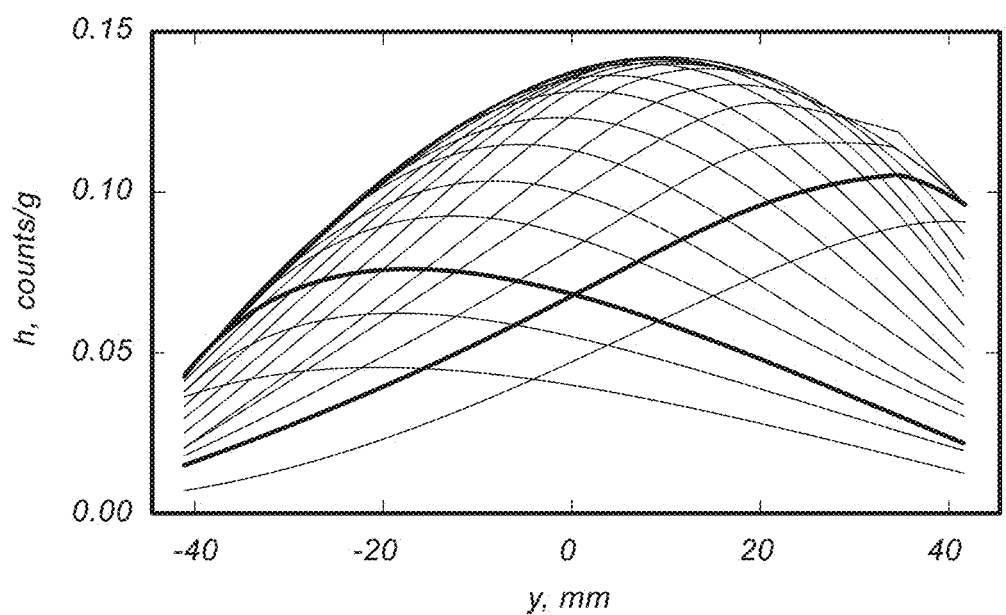
FIG. 7 illustrates an example of force data as received by sensors in response to two fingers of a user depressing upon a flexible touchscreen, in accordance with one embodiment of the present disclosure.

As force is applied to the touch input surface 22 by a user's finger, the applied force spreads across the input surface and the force response (for example, deflection measurement values, capacitance, strain and the like) as measured by the force sensor or sensors 24 may look like a bell curve (as shown in FIG. 7).

Given a set of touch locations, embodiments of the present disclosure aid in determining or apportioning the relative forces contributed by each touch of a user's finger on a touch input surface 22. By determining the amount of force associated with each touch of a user's finger on a touch input surface 22, such information can be utilized by the electronic devices processor (FIG. 4) to perform a variety of functions or operations for the benefit of the user. It should be appreciated that a user's touch location may be determined through the use of any of various touch-sensing technologies, such as capacitive sensing, resistive sensing, thermal sensing, and so on. Accordingly, the details of technologies designed to sense the location of a touch are not described in more detail herein.

Figure 3:
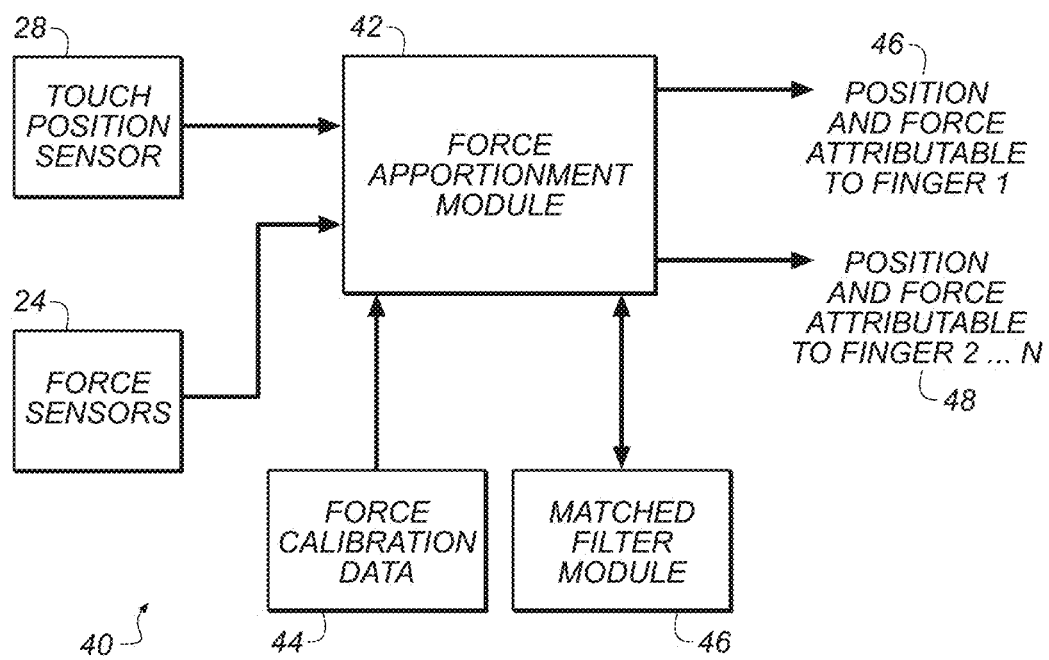
FIG. 3 illustrates an example of a block diagram of a force apportionment module for use in an electronic device, in accordance with one embodiment of the present disclosure.

If desired, a variety of features and functions described herein can be integrated into an input device 40 which may be incorporated within electronic device 20. Referring to FIG. 3, one example of an input device 40 is illustrated, which includes a plurality of touch position sensors 28 and a plurality of force sensors 24. As previously discussed, the touch position sensors 28 and force sensors 24 may be any of a variety of different sensors employing different sensing technologies. The input device 40 may also include a force apportionment module 42 which receives, as inputs, position information (such as (x, y) touch coordinates) from the touch position sensors 28, and force data (such as force deflection measurement values) from the plurality of force sensors 24. The force apportionment module 42 may also receive force calibration data 44, representing the expected amount of force received by a plurality of force sensors 24 in response to a fixed unit of force applied across various known locations of the input device 40 and/or electronic device 20. A matched filter module 46 may also be provided in order to aid in the determination of the amount of forces to be apportioned to each depression of a user's fingers of the input device 40.

The force apportionment module 42 may be configured to implement one or more operations, processes (or portions thereof), features or functions as described herein. In one example, the force apportionment module 42 determines or apportions a first amount of force as measured by the plurality of force sensors 24 to one of at least two fingers, and determines or apportions a second amount of force as measured by the plurality of force sensors 24 to another of the at least two fingers.

The input device 40 may provide, as outputs 46, 48 of the force apportionment module, the position and force attributable to the depression by a user of a user's finger (shown as 46), and the position and force attributable to the depression by a user of another one or more of a user's finger (shown as 48). For instance, where a user employs two fingers at different locations to touch the input device, the input device 40 of FIG. 3 can generate as outputs, the position and forces attributable to the depressions of each of the user's two fingers. These outputs 46, 48 can be passed to the processor(s), logic, or other components or modules of the electronic device 20 that is interacting with the input device 40 of FIG. 3.

In one example, matched filter techniques (for instance, as described herein) may be utilized by module 46 to determine forces contributed by each touch of one or more fingers of a user on a touch input device 40 of an electronic device 20.

Figure 8A:
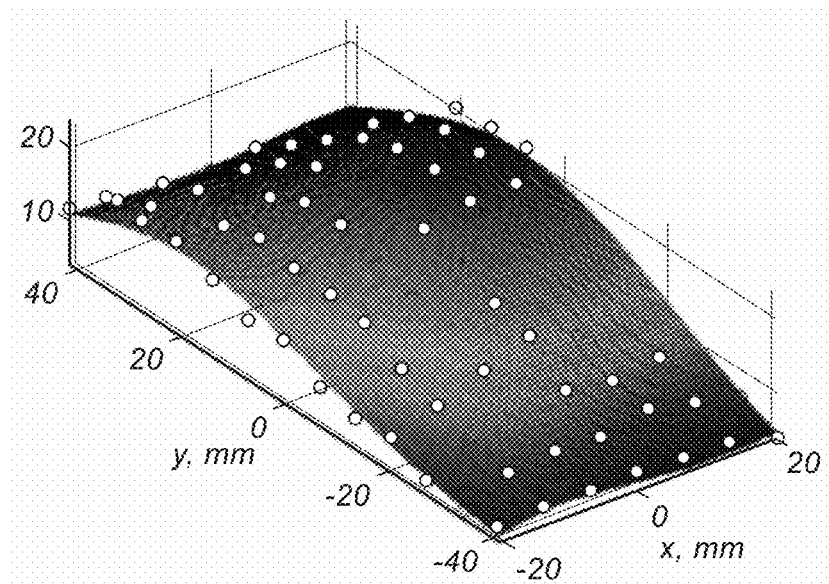
FIG. 8 illustrates an example of Gaussian profiles of forces on a flexible touchscreen, in accordance with one example of the present disclosure.

In one embodiment of the present disclosure and still referring to FIG. 3, a library of data 44 is maintained in the electronic device 20 which includes force calibration data representing the force deflection measurement values as measured by each of a plurality of force sensors 24 (such as 24 or representative versions of sensors 24), in response to a standardized force applied to various known locations on a touch input surface (such as 22 or representative versions of touch input surface 22). In one example and referring to FIG. 5, to form the calibration data 44, a robot or other mechanized, repeatable process may be utilized to apply a known amount of force (for example, the same amount of force) to different known locations on a touch input surface, and for each touch location, force deflection measurement values as reported by each of the force sensors is stored in the library 44. In effect, this library of data 44 forms a map (e.g., FIG. 8A) of deflections as a function of sensor locations for a given touch location (X, Y). This library 44 may be stored in the electronic device 20 in any form, such as but not limited to a matrix, a table, a lookup table, a database, parametric representations, or in the form of any other data structure.

Figure 4:
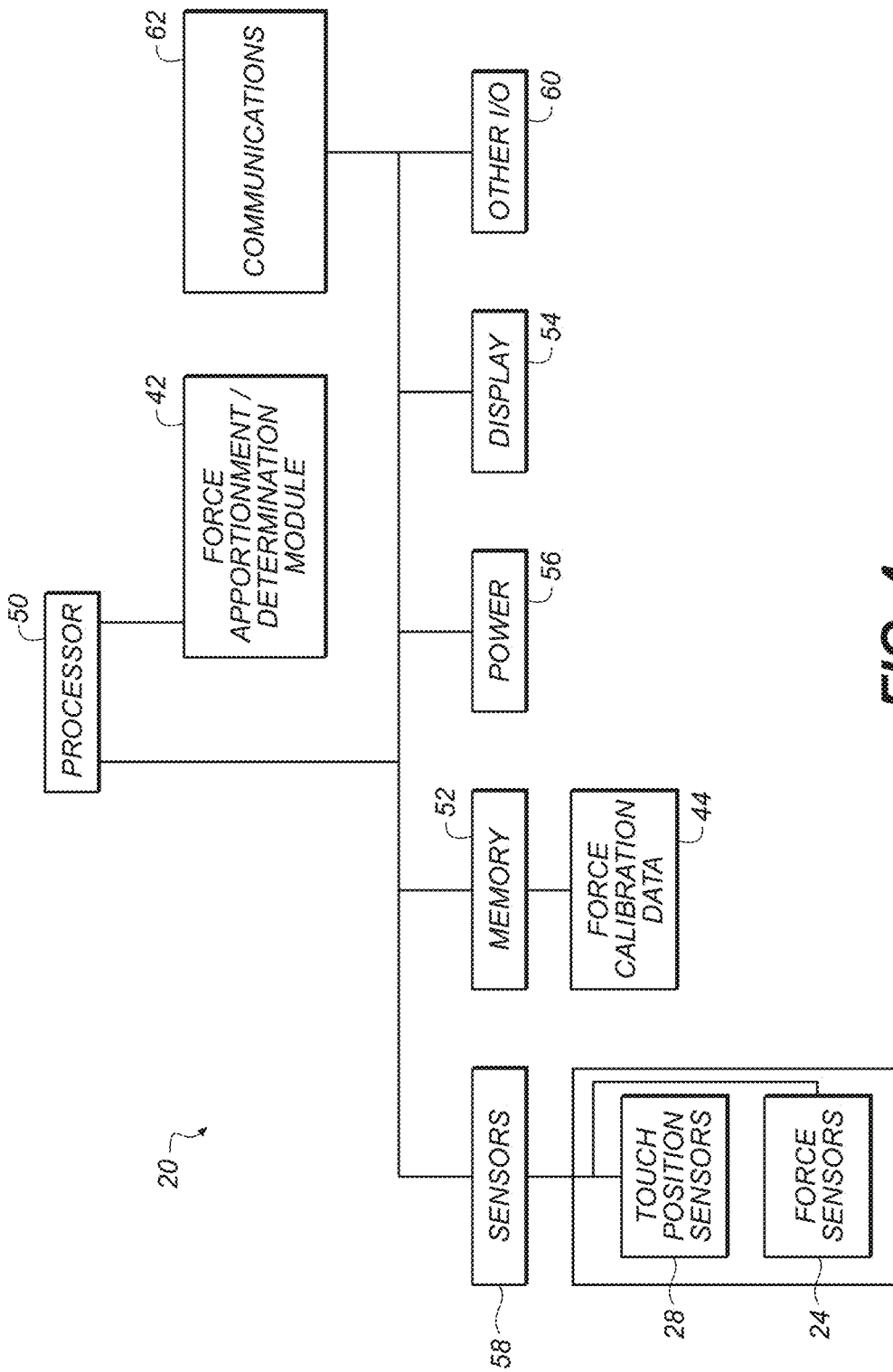
FIG. 4 illustrates an example of a block diagram of an electronic device having a force apportionment module incorporated therein, in accordance with one embodiment of the present disclosure.

An input device 40 in accordance with embodiments of the present disclosure may be stand-alone devices (such as a standalone track pad), or may be incorporated into electronic devices 20 such as mobile phones, tablet computers, or other portable electronic devices. FIG. 4 illustrates an example of a block diagram of an electronic device 20 having a force apportionment module 42 incorporated therein, in accordance with one embodiment of the present disclosure. In the example of FIG. 4, an electronic device 20 includes a processor 50 coupled with and in communications with a memory 52, a display 54, power circuitry 56, and one or more sensors 58, input/output devices 60, and communication modules 62 coupled with processor 50. The sensors 58 may include a plurality of touch position sensors 28, and a plurality of force sensors 24. The memory 52 may include a persistent memory or data structure including force calibration data 44 representing the expected amount of force received by a plurality of force sensors in response to a fixed unit of force applied across various known locations of the input device.

In one example in FIG. 4, the processor 50 may include a force apportionment module 42 that interacts with and receives data from the position sensors 28, force sensors 24, and the force calibration data 44. The force apportionment module 42 may be configured to implement one or more operations, processes (or portions thereof), features or functions as described herein. The force apportionment module 42 can determine, in one example, the position and force attributable to the position and force attributable to the depression by a user of a user's finger, and the position and force attributable to the depression by a user of another one or more of a user's finger.

Figure 5:
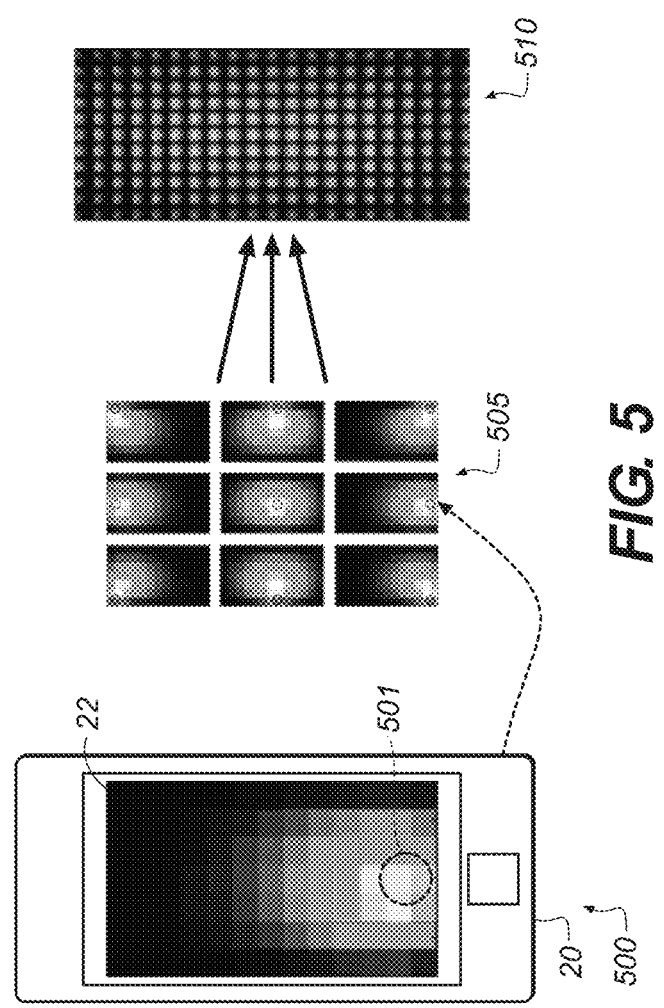
FIG. 5 illustrates an example of generating calibration data relating to distribution of forces in response to a unit of force applied to various known locations on a flexible touchscreen of an electronic device, in accordance with one embodiment of the present disclosure.

FIG. 5 illustrates an example of various calibration techniques in accordance with an embodiment of the present disclosure. At operation 500, a robot or other device applies a known amount of force to a specified location (an example location 501 is shown in FIG. 5) on a touch input surface 22 of an electronic device 20. At operation 505, deflection maps for all touch locations are analyzed. In other words, the force measurement values, as detected by each force sensor 24 of the electronic device 20 in response to the robotic touch of operation 500, are recorded.

It should be appreciated that the force sensors 24 may not be at or adjacent the location at which force is applied. Nonetheless, the force sensors 24 may register the force insofar as the input surface may be at least somewhat deformable, thereby permitting force exerted at one point to be spread over a region. Thus, force sensors 24 nearest the force application location may register a higher force than force sensors that are further away from the force application location. Since the registered force may decrease with the distance between the force sensor 24 and force application location, force sensors that are sufficiently removed from the force application location may register no, or almost no, force.

Operations 500-505 are repeated for differing locations (other than at 501) on the touch input surface 22 where the robot applies the known amount of force, until a sufficient amount of data has been gathered representing the regions which a user could touch the touch input surface during use. Each force sensor 24 may thus generate a force map, formed from various measurements of known forces at various known locations on touch input surface 22. Generally, each force sensor's force map is different from the force maps of the other force sensors, reflecting the variances in positioning of the force sensors within the electronic device. Force maps may also, in some circumstances, reflect differences between each individual force sensor, such as sensitivity, construction and the like.

Figure 8B:
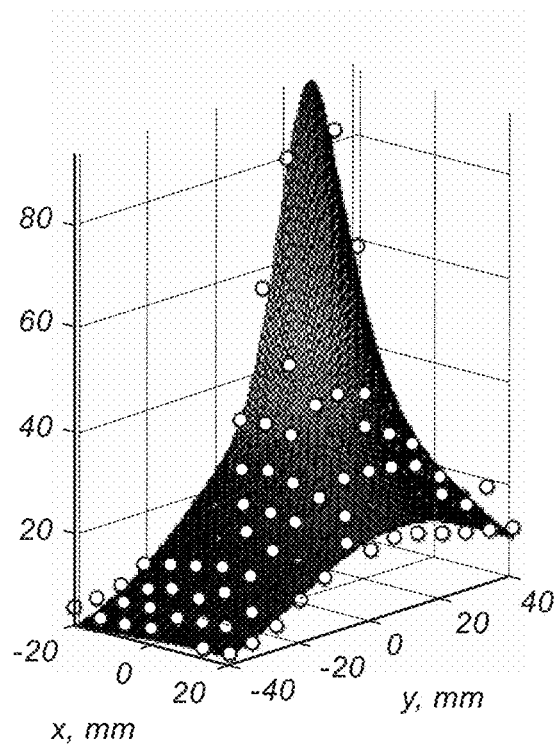

In this manner, a two-dimensional distribution of calibration data (the force map) can be formulated, such as shown at 510. In this disclosure a force map (represented in certain equations by the variable "G") (e.g. FIG. 8B) represents what an expected force response should be at a given touch location for a given force input value. Through the use of the force map, forces exerted at known touch locations, as provided via the touch sensors, may be correlated to force inputs. This information may be used to apportion an overall detected force between multiple touch locations.

Figure 6:
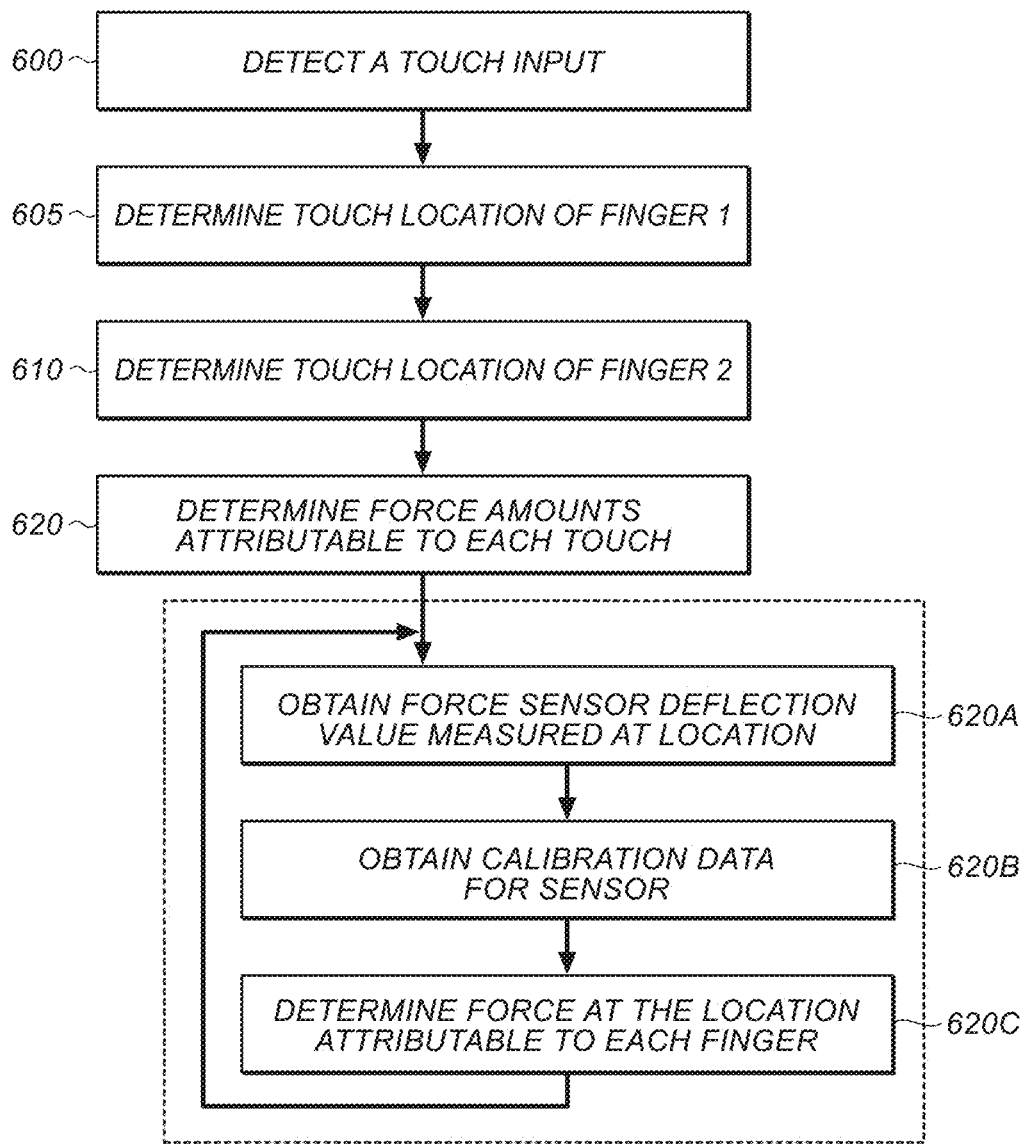
FIG. 6 illustrates an example of a process for apportioning forces among multiple input fingers depressed upon a flexible touchscreen, in accordance with one embodiment of the present disclosure.

FIG. 6 illustrates an example of a process for apportioning forces among multiple input fingers exerting force on a flexible input surface, in accordance with one embodiment of the present disclosure. ("Flexible or "deformable" may refer to any substance or surface that will deform locally under a load rather than moving uniformly as a rigid body. Glass, for example, may be flexible/deformable.) These operations, or portions thereof, may be utilized within an electronic device, in one example. At operation 600, one or more touch input conditions are detected. For instance, operation 600 may include the detection of a touch on an touch input surface of an input device, or may detect multiple touches on a surface of an input device.

At operation 605, the locations of touches detected by operation 600 are determined. In one example, operation 605 receives or obtains location information (e.g., (x, y) coordinates) of a first touch location on the surface of a touch input device. At operation 610, the location of a second touch, if present, is determined; in some embodiments, operations 605 and 610 are combined or otherwise occur substantially simultaneously. In one example, operation 610 receives location information (e.g., (x, y) coordinates of a second touch location. If other touches (e.g., a third touch from a third finger) are detected that occur substantially together in time with the first touch and the second touch, the locations of those other touches are also determined from the touch sensors.

At operation 620, the amounts of force attributable to each touch on the touch input device are determined. Operation 620 may be performed utilizing a number of different methodologies. In one example, operations 620A-620C are utilized to determine the amounts of force attributable to each touch. These operations may be performed iteratively on some or all of the touch force sensors of the touch input device of the electronic device, in one example.

At operation 620A, the force value at a force sensor at a particular location is obtained. In one example, an input in response to a finger touch, as measured by a force sensor at a particular location, is obtained or read by operation 620A. This input may be correlated to a force experienced by the particular force sensor.

At operation 620B, the force map data for the force sensor of operation 620A is retrieved or otherwise obtained. The force maps generated by each force sensor are generally described above.

At operation 620C, the force attributable to each finger touch location on the touch input device at the force sensor location is determined. In one example, as described herein, operation 620C may utilize a matched filter process in order to determine the amount of force attributable to each finger depression on the input touch device at the particular force sensor location.

Operations 620A-620C may be repeated for each force sensor location of the touch input device, in one example.

Hence it can be seen that the operations of FIG. 6 provide, for each touch detected, the touch location and the force attributable to the touch. This information can be utilized within the electronic device for a variety of purposes, such as but not limited to those purposes as described herein.

Matched Filters

In one embodiment, an entire force profile of the touch input surface is characterized as a vector, and its dot product with actual force response data at a particular force sensor location is calculated, along with other touch location's predicted force responses and their dot products with the actual force response measurements at those other locations. The result can be isolated to determine the amount of force attributed to a user's first finger; and the result can be isolated to determine the amount of force attributed to a user's second finger; and if more touches from more than two fingers are detected, the forces attributed to the additional fingers can be determined. That is, the operation may attribute individual forces to individual touch locations, as vectors, thereby estimating the forces applied at each touch location from an overall applied force.

Dot products are useful in manipulating or determining values based on vectors, wherein the result of a dot product operation is a scalar quantity. For instance, for vectors (a, b), "a dot b" can be represented as (magnitude of a)×(magnitude of b)×cosine(theta), where theta is the angle between the vectors a, b. Another way of expressing of "a dot b" is (ax×bx)+(ay×by).

Matched Filters for Two-Finger Touch Inputs

In one example, a matched filter is utilized to determine the amount of force ($f_1$, $f_2$, $f_n$) attributable to each finger depression (1, 2, ... N) upon the touch input surface. A linear set of equations can be used:

$$\begin{cases} \vdots \\ f_1 \cdot g_i + f_2 \cdot h_i = s_i \\ \vdots \end{cases}$$

where $s_i$ represents present/current force deflection measured by sensor i=1 ... N $g_i$ represents deflection expected for sensor i, for unit force at A (see FIGS. 7-8)

$h_i$ represents deflection expected for sensor i, for unit force at B (see FIGS. 7-8)

The values for $g_i$ and $h_i$ may be obtained from the library of force calibration data, in one example, for each force sensor. The force ($f_1$, $f_2$, $f_n$) attributable to each finger's depression onto the touch input surface can be determined using the following example operations:

$$f_1 = (\Sigma s_i g_i \cdot \Sigma h_i^2 - \Sigma s_i h_i \cdot \Sigma g_i h_i)/\Delta$$

$$f_2 = (-\Sigma s_i g_i \cdot \Sigma g_i h_i + \Sigma s_i h_i \cdot \Sigma g_i^2)/\Delta$$

$$\Delta = \Sigma g_i^2 \cdot \Sigma h_i^2 - (\Sigma g_i h_i)^2$$

For N sensors, there can be N equations in one embodiment.

In some special cases of the above equations, when for example, the user's two fingers are close to each other, the expected deflection maps produced by both fingers are similar ($g_i$ is approximately $h_i$), and the denominator vanishes ($\Delta$ approaches 0). The equations for $f_1$ and $f_2$ become highly unstable, and any perturbations (for example, measurement noise) in $s_i$ will be highly amplified, contributing to large force reconstruction errors. The constant $\lambda$ may be introduced to keep the equation stable and without discontinuities.

For example, in case of two fingers detected as contacting the display 22, the system of linear equations can be written as:

$$\begin{cases} f_1 \cdot \left(\sum g_i^2 + \lambda\right) + f_2 \cdot \sum g_i h_i = \sum s_i g_i \\ f_1 \cdot \sum g_i h_i + f_2 \cdot \left(\sum h_i^2 + \lambda\right) = \sum s_i h_i \end{cases}$$

$$f_1 = (\Sigma s_i g_i \cdot (\Sigma h_i^2 + \lambda) - \Sigma s_i h_i \cdot \Sigma g_i h_i)/\Delta_\lambda$$

$$f_2 = (-\Sigma s_i g_i \cdot \Sigma g_i h_i + \Sigma s_i h_i \cdot \Sigma g_i^2 + \lambda))/\Delta_{80}$$

$$\Delta_\lambda = \Sigma g_i^2 \cdot \Sigma h_i^2 - (\Sigma g_i h_i)^2 + \lambda \cdot (\Sigma g_i^2 + \Sigma h_i^2) + \lambda^2$$

The denominator $\Delta_\lambda$ no longer vanishes when $g_i$ is approximately $h_i$, and the solution becomes stable with respect to measurement perturbations. While improving the stability of the solution, the regularization parameter $\lambda$ also degrades the accuracy of force reconstruction (due to the additional terms in the equations for $f_1$ and $f_2$)

In order to preserve the reconstruction accuracy in cases when solution is otherwise stable and regularization is not required, it is possible to vary the magnitude of $\lambda$, depending on, for example, the distance between the fingers, or their location on the screen 22. One example of an adaptive regularization parameter is:

$$\lambda(r) = \lambda_{max} - \frac{\lambda_{max}}{\left(\frac{\lambda_{max}}{\lambda_{max} - \lambda_{min}} + e^{-\frac{r-r_o}{w}}\right)}$$

where r is the distance between the fingers. For small distances ($r<r_o$), the function assumes a maximal value $\lambda_{max}$ yielding high amounts of regularization: solution stability is increased at the cost of force reconstruction accuracy (total applied for will be distributed equally between the two fingers, in this example).

For large separation distances ($r>r_o$) between the fingers that touch display 22, when the solution is stable, the regularization is minimal ($\lambda(r)=\lambda_{min}$) and force reconstruction accuracy is improved.

For distances where r approximately equals $r_o$, the regularization parameter $\lambda$ is reduced smoothly (e.g., within a fuzzy window +/−w) to balance force reconstruction accuracy and stability.

In other words, the constant $\lambda$ may be used to compensate for system irregularities that may otherwise cause the equations to return inaccurate of erroneous results.

In more general cases of K fingers, the regularization parameter $\lambda$ may be introduced as:

$$\begin{pmatrix} g_{1,1} & g_{1,2} & \cdots & g_{1,K} \\ g_{2,1} & g_{2,2} & \cdots & g_{2,K} \\ \vdots & \vdots & \ddots & \vdots \\ g_{N,1} & g_{N,2} & \cdots & g_{N,K} \\ \sqrt{\lambda} & 0 & \cdots & 0 \\ 0 & \sqrt{\lambda} & \cdots & 0 \\ \vdots & \vdots & \ddots & \vdots \\ 0 & 0 & \cdots & \sqrt{\lambda} \end{pmatrix} \cdot \begin{pmatrix} f_1 \\ f_2 \\ \vdots \\ f_K \end{pmatrix} = \begin{pmatrix} s_1 \\ s_2 \\ \vdots \\ s_N \\ 0 \\ 0 \\ \vdots \\ 0 \end{pmatrix}$$

where $g_{n,k}$ is the expected response of sensor n for a unit force at the location of finger k.

Matched Filter for a Single Finger Touch Inputs

The force (f) attributable to a single finger's depression onto a touch input surface can be determined using the following example operations:

$$f = \frac{\sum_{i=1}^{N} g_i s_i}{\sum_{i=1}^{N} g_i^2}$$

where $s_i$ represents the present/current deflection measured by sensor i=1 ... N $g_i$ represents deflection expected for sensor i, when a unit force is applied at a given location.

The values for $g_i$ may be obtained from the library of force calibration data, in one example, for each force sensor.

N can either be equal to the total number of sensors, or represent a small group of sensors around the touch location (s). The choice may vary between embodiments, and may be based on a number of factors, such as the size of the embodiment, the spacing of the force sensors, the material(s) used for the input surface, other physical properties of the input surface (such as flexibility), and the like.

In another embodiment, data from sub-clusters of force sensors can be grouped together and averages of their data can be determined before applying the dot product operations. For instance, data clusters of (2 force sensors by 2 force sensors) can be formed using the deflection measurement values from force sensors. This can reduce the number of dot product calculations to be performed, which can reduce the run-time complexity and reduce the memory requirements for the processor to perform the processes disclosed herein, but results in less accurate resultant data as to force values. In another example, force sensors (or their outputs) may be sorted by the magnitudes of their expected signals (which may be obtained from calibration data, as one example), and a dot product operation applied to the expected and measured values comprising pairwise differences between the sensors having expected largest and smallest values. Such a grouping may be used, for example, in a single finger force reconstruction scenario to mitigate the effects of common-mode and/or spatially correlated noise that may be present in sensor outputs.

In another example, for two or more finger inputs (where k=the number of fingers), the expression G dot f=S can be used, wherein G is expressed as a column vector having m rows corresponding to the number of sensors, G has columns corresponding to the number of fingers. Since this expression has, in practice, more rows than columns, a leastsquared process can be used to minimize [[(G dot f)−s]], wherein G is expressed as a matrix of (m by k) and f is a force vector of (k by 1). From this, values for f can be determined for each finger k.

Accordingly, it can be seen that embodiments of the present disclosure provide for the apportionment of measured forces applied by multiple fingers of a user to a touch input surface of an electronic device. In this way when a user touches a touch input surface with two or more fingers, a determination can be made of the amount of force applied by each finger to the touch input surface. This determination can be useful for providing the electronic device with additional dimensions of user input and control to the device, which can be used to enhance the user's experience and interaction with the electronic device.

In another embodiment of the present disclosure, the accuracy of match filters may be further enhanced, if desired, to account for possible damage that may occur to the electronic device (e.g., device 22 or 40). Certain events during a life time of a device may cause boundary conditions to change, which can lead to significant differences between the expected and observed deflection maps.

In some cases, it may be possible to partially compensate for these changes, for example, by changing the weights (or levels of trust) in the readings of certain affected sensors. In one example, the trust in the values from around the edges of input surface 22 are minimized (based on that after a drop of the device, those edge sensors may be adversely affected), and the trust in the sensors towards the center of the input surface 22 are increased (as these sensors are likely intact after a drop of the device). For instance, for a system of equations:

$$\begin{bmatrix} g_1 \\ \vdots \\ g_n \end{bmatrix} \cdot f = \begin{bmatrix} s_1 \\ \vdots \\ s_n \end{bmatrix}$$

In one example, instead of minimizing $$\sum_{i=1}^{N} (s_i - g_i \cdot f)^2$$

a minimization operation can be performed on (f):

$$\sum_{i=1}^{N} w_i \cdot (s_i - g_i \cdot f)^2$$

Dynamic weights that can be related to, for example: (a) current location of the deflection centroid, (b) shift of the current deflection centroid from its expected location for a given touch, (c) distance of the sensing pixel from the device borders (as to reduce the dependence on the boundary conditions), or other metric that indicates the level of trust in the output of particular sensors.

In one example, changing the weights (or levels of trust) in the readings of certain affected sensors around the expected centroid can be upweighted, and pixels around the observed (shifted) centroid can be deweighted. In another example, changing the weights (or levels of trust) in the readings of certain affected sensors can be achieved by upweighting the sensors close to the center of the screen 22.

Figure 10A:
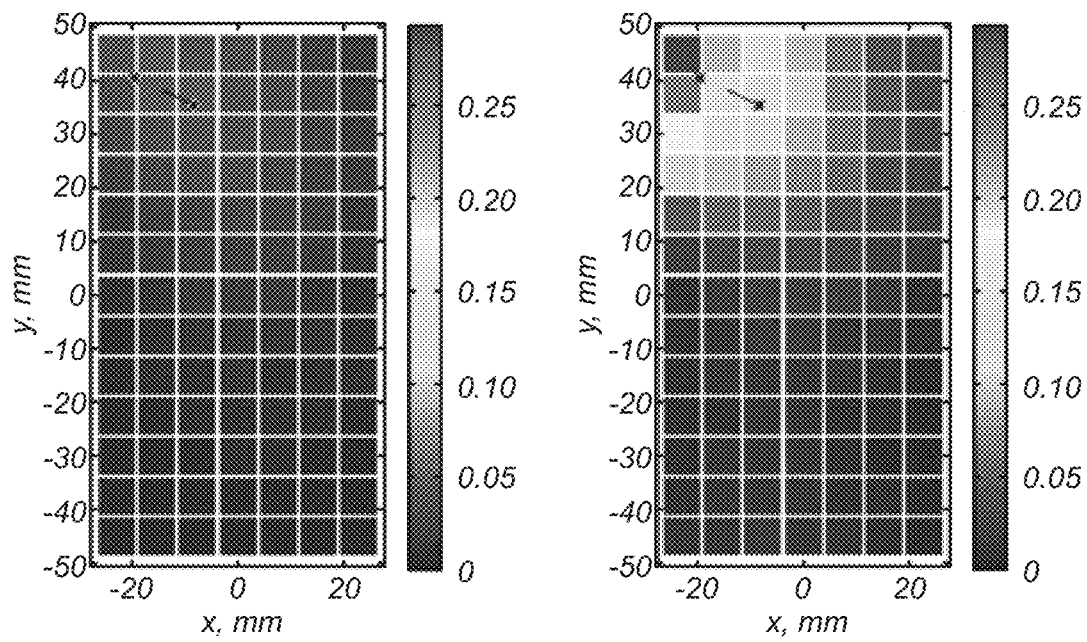
FIGS. 10A-C illustrate an example of improving matched filter accuracy to account for possible drops of a device, in accordance with one example of the present disclosure.

For instance, FIG. 10A shows in the left image an example of a deflection map with intact borders; while the right image in FIG. 10A shows an example deflection map in a situation where the border has been broken such as where a break has occurred near the top left corner of the device, and a user finger press is near the top left corner.

Figure 10B:
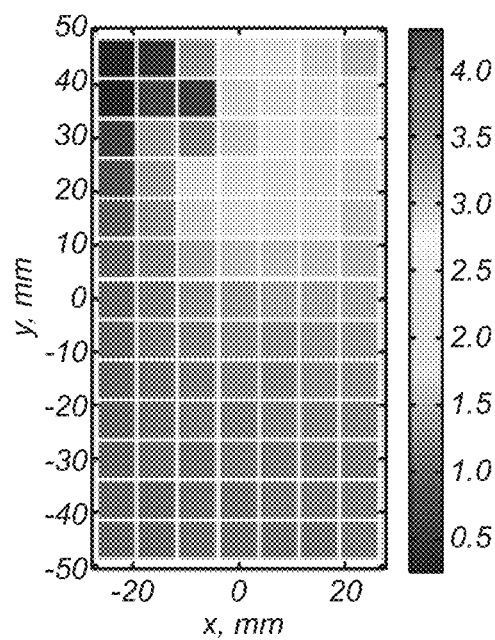
Figure 10C:
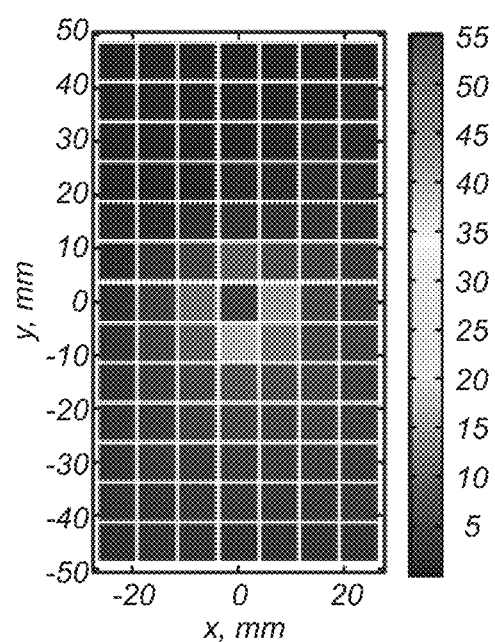

FIGS. 10B and 10C then show possible distributions of weights "w" per equation above in paragraph [0089]. FIG. 10B illustrates an example where the old centroid has been upweighted, and the new centroid is deweighted.

In another example, FIG. 10C illustrates an example where screen center sensor readings have been upweighted, thereby putting more trust into sensors away from the device boundaries.

In another example of the present disclosure, matched filter accuracy improvement may be achieved via border sensor subtraction, in order to aid in situations where sensors may have been damaged due to drops of the device.

For instance, certain breaks in device boundaries may lead to a significant compliance increase for the touches in the vicinity of that boundary. For those touches, the deflection centroid shifts towards the break, and the deflection profile resembles that of a partially supported plate (e.g., plate with force sensors 24) with a free boundary section. It may be possible to partially compensate for these boundary condition breaks by subtracting the "cantilever" mode from the observed deflections. The cantilever mode may be determined by fitting a representative parametric shape to the deflections observed by the boundary sensors.

Figure 11A:
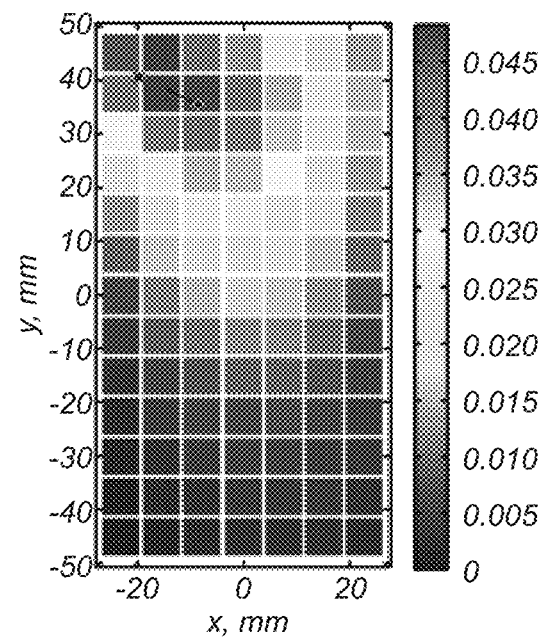
FIGS. 11A-E illustrate another example of improving matched filter accuracy to account for possible drops of a device, in accordance with one example of the present disclosure.
Figure 11B:
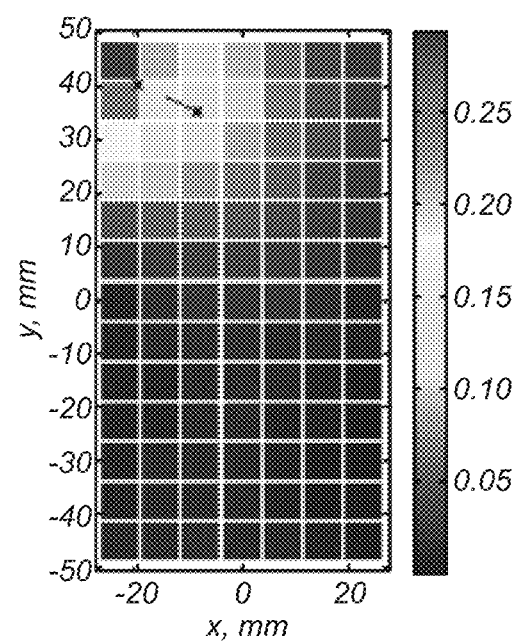
Figure 11C:
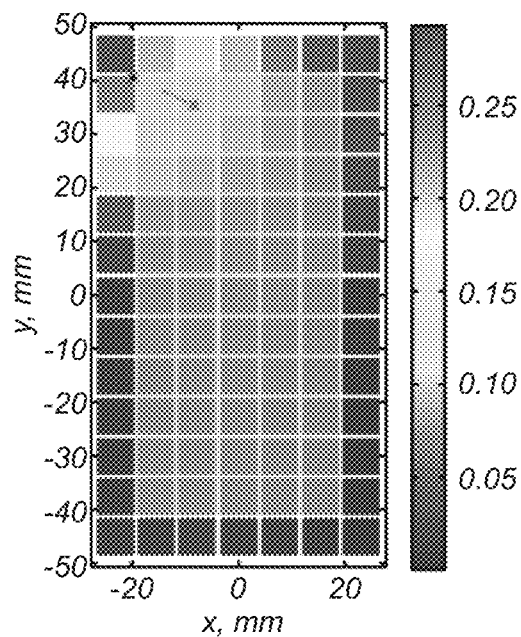
Figure 11D:
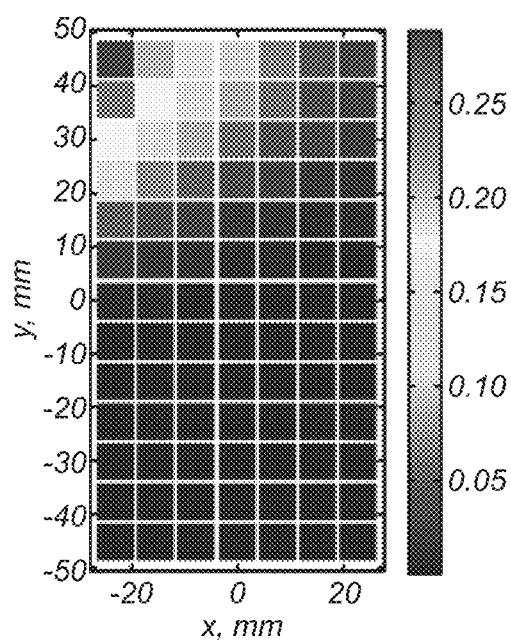
Figure 11E:
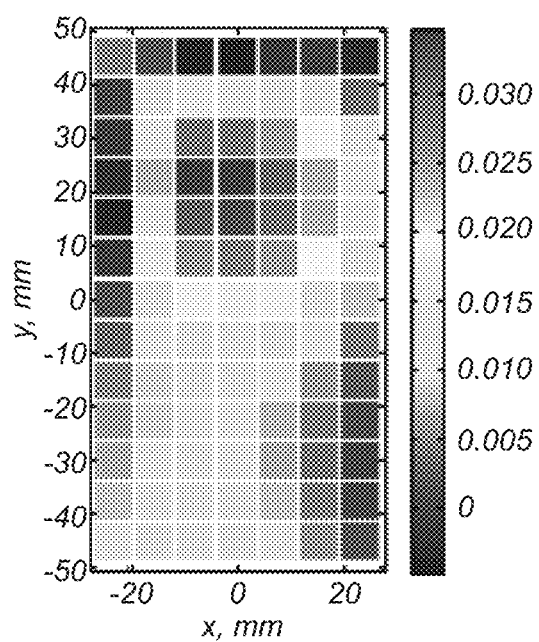

For example, the border sensors are no longer part of the weighted least squares estimation. The magnitude of the subtracted cantilever mode can be further scaled in proportion to the deflection centroid shift. Cantilever mode may be approximated by a 2D Gaussian, centered outside of the screen active area. In FIG. 11A, an example of a calibrated deflection map is shown where the device borders are intact. In FIG. 11B, an example of a deflection map is shown where a broken border exists at the top left of the device display, and the centroid shifts and compliance increases. In FIG. 11C, an example is shown where a "cantilever" fit mode is used using data from the border sensors. In FIG. 11D, the cantilever mode is propagated into the interior. In FIG. 11E, the adjusted map is shown wherein the cantilever mode has been subtracted from the observed deflection map of FIG. 11B.

While embodiments of the disclosure have been described with reference to a tablet computer or a mobile phone, it is understood that embodiments of the present disclosure can be utilized with a variety of electronic devices including but not limited to mobile devices, mobile phones, tablet computers, music and multi-media players, watches, gaming devices, and other handheld, wearable or portable devices.

While the methods disclosed herein have been described and shown with reference to particular operations performed in a particular order, it will be understood that these operations may be combined, sub-divided, or re-ordered to form equivalent methods without departing from the teachings of the present disclosure. Accordingly, unless specifically indicated herein, the order and grouping of the operations is not a limitation of the present disclosure.

It is understood that the directional references provided herein, such as top, bottom, upwards, downwards, clockwise, counterclockwise, left, right, and the like, are provided to describe examples of the embodiments disclosed herein, and are not intended to be limiting.

It should be appreciated that in the foregoing description of exemplary embodiments of the disclosure, various features of the disclosure are sometimes grouped together in a single embodiment, figure, or description thereof for the purpose of streamlining the disclosure and aiding in the understanding of one or more of the various aspects. This method of disclosure, however, is not to be interpreted as reflecting an intention that the claims require more features than are expressly recited in each claim. Rather, inventive aspects lie in less than all features of a single foregoing disclosed embodiment, and each embodiment described herein may contain more than one inventive feature.

While the disclosure is presented and described with reference to embodiments thereof, it will be understood by those skilled in the art that various other changes in the form and details may be made without departing from the spirit and scope of the disclosure.

We claim:

1. In an electronic device, a system for determining amounts of forces applied by at least two fingers of a user to a touch input device having a touch input surface, comprising:
   a plurality of force sensors distributed about the touch input surface;
   a plurality of touch sensors distributed about the touch input surface and distinct from the plurality of force sensors; and
   a processor configured to apportion a first amount of force as measured by the plurality of force sensors to a first finger of the at least two fingers, and to apportion a second amount of force as measured by the plurality of force sensors to a second finger of the at least two fingers, the processor configured to apportion the first and second amounts of force by:
      receiving input from the plurality of touch sensors corresponding to a first touch location associated with the first finger and to a second touch location associated with the second finger;
      receiving input from the plurality of force sensors corresponding to a deflection of the touch input surface as a result of the first finger touching the first touch location and the second finger touching the second touch location; and
      modifying the input received from the plurality of force sensors using a first vector of force calibration data corresponding to the first touch location and a second vector of force calibration data corresponding to the second touch location, wherein,
   each of the first vector and the second vector represent expected amounts of force received by the plurality of force sensors in response to a fixed unit of force applied at the first touch location or the second touch location respectively; and
   an amount of force measured by at least one force sensor in the plurality of force sensors is apportioned between the first touch location and the second touch location.

2. The system of claim 1, further comprising a persistent data structure including force calibration data comprising
   the first vector of force calibration data; and
   the second vector of force calibration data.

3. The system of claim 2, wherein the force calibration data includes force deflection measurement values as measured by each of the plurality of force sensors in response to a standardized force applied to a plurality of varied known locations on the touch input surface.

4. The system of claim 1, wherein the processor includes a matched filter.

5. The system of claim 1, wherein the plurality of touch sensors detect one or more locations of one or more touches that occur simultaneously on the touch input surface.

6. The system of claim 5, wherein the processor provides force data related to an amount of force applied by the first finger to the first touch location.

7. The system of claim 5, wherein the processor provides force data related to an amount of force applied by the second finger to the second touch location.

8. The system of claim 1, wherein the touch input surface includes a flexible layer that deflects in response to the force applied by the at least two fingers of the user.

9. The system of claim 1, wherein the touch input device includes a track pad.

10. A method for determining amounts of forces applied by at least two fingers of a user to a touch input surface of an electronic device having a plurality of force sensors associated with the touch input surface, the method comprising:
    providing calibration data for the electronic device, the calibration data including force deflection measurement vectors comprising measurements by each of the plurality of force sensors in response to a standardized force applied to a plurality of varied known locations on the touch input surface;
    detecting a first touch at a first location using a set of touch sensors of the touch input surface;
    detecting a second touch at a second location using the set of touch sensors of the touch input surface;
    obtaining force data measured by the plurality of force sensors;
    modifying the obtained force data based on force deflection measurement vectors associated with the first location and the second location;
    apportioning a first amount of force as measured by the plurality of force sensors to one of the first location or the second location; and
    apportioning a second amount of force as measured by the plurality of force sensors to one of the first location or the second location; wherein,
    the plurality of force sensors is distinct from the set of touch sensors;
    an amount of force measured by at least one force sensor in the plurality of force sensors is apportioned between the first touch and the second touch.

11. The method of claim 10, wherein the electronic device is a smart phone.

12. An electronic device, comprising:
    a processor;
    a memory including a persistent memory, the memory coupled with the processor;
    a flexible touch input surface which deforms in response to two or more touches applied by a user to the touch input surface;
    a plurality of touch sensors distributed about the touch input surface, the touch sensors detecting two or more locations of the two or more touches that occur simultaneously on the touch input surface;
    a plurality of force sensors distributed about the touch input surface and independent from the plurality of touch sensors; wherein,
    the processor is configured to apportion a first amount of force as measured by the plurality of force sensors to a first touch location, and to apportion a second amount of force as measured by the plurality of force sensors to a second touch location, using force calibration data obtained for the plurality of force sensors in response to a standardized force applied to the first touch location and the second touch location; and an amount of force measured by at least one force sensor in the plurality of force sensors is apportioned between the first touch location and the second touch location.

13. The electronic device of claim 12, wherein the persistent memory includes the force calibration data, the force calibration data having a plurality of force deflection measurement values as measured by each of the plurality of force sensors in response to the standardized force applied to the first touch location and the second touch location.

14. The electronic device of claim 13, wherein the processor examines an amount of force measured at each of the plurality of force sensors in relations to the force calibration data.

15. The electronic device of claim 13, wherein the electronic device includes a tablet computing device.

16. The electronic device of claim 12, wherein the processor includes a matched filter.

17. The electronic device of claim 12, wherein the flexible touch input surface includes a flexible glass layer.

* * * * *